US012750916B2

(12) United States Patent
Harris et al.

(10) Patent No.: US 12,750,916 B2
(45) Date of Patent: Sep. 29, 2026

(54) DETERMINING UPLINK GRANT DURING CELL DISCONTINUOUS TRANSMISSION

(71) Applicant: Nokia Technologies Oy, Espoo (FI)

(72) Inventors: John Harris, Whitefish Bay, WI (US); Daniela Laselva, Aalborg (DK); Nhat-Quang Nhan, Massy (FR); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 438 days.

(21) Appl. No.: 18/316,798

(22) Filed: May 12, 2023

(65) Prior Publication Data

US 2024/0381481 A1 Nov. 14, 2024

(51) Int. Cl.
*H04W 76/28* (2018.01)
*H04W 72/1268* (2023.01)

(52) U.S. Cl.
CPC ....... *H04W 76/28* (2018.02); *H04W 72/1268* (2013.01)

(58) Field of Classification Search
CPC ............. H04W 76/28; H04W 72/1268; H04W 52/0206; H04W 72/115; H04W 72/23
See application file for complete search history.

(56) References Cited

U.S. PATENT DOCUMENTS

2024/0237135 A1* 7/2024 Wu ........................ H04W 76/28
2024/0373503 A1* 11/2024 Elazzouni ......... H04W 74/0833

FOREIGN PATENT DOCUMENTS

WO WO-2023212511 A1 * 11/2023 ........... H04L 5/0091

OTHER PUBLICATIONS

Juha Korhonen et al. "Report of [301][NES] Summary of DTX/DRX—8.3.2"; R2-2213071; vol. 3GPP Ran 2, No. Roulouse, FR Nov. 14, 2022-Nov. 18, 2022 (Nov. 14, 2022) (Year: 2022).*
Min Zhu et al. "DTX/DRX for network Energy Saving"; R1-2300693; vol. 3GPP Ran 1, No. Athens, GR; Feb. 27, 2023-Mar. 3, 2023 (Feb. 17, 2023) (Year: 2023).*
Machine Translation of WO 2023212511 A1 (Year: 2023).*
"New SI: Study on network energy savings for NR", 3GPP TSG RAN Meeting #94e, RP-213554, Agenda: 8A.1, Huawei, Dec. 6-17, 2021, 5 pages.
"3rd Generation Partnership Project; Technical Specification Group Radio Access Network; Study on network energy savings for NR (Release 18)", 3GPP TR 38.864, V18.1.0, Mar. 2023, pp. 1-72.
"New WID: Network energy savings for NR", 3GPP TSG RAN Meeting #98-e, RP-223540, Agenda: 9.1.1, Huawei, Dec. 12-16, 2022, pp. 1-6.

(Continued)

*Primary Examiner* — Khaled M Kassim
*Assistant Examiner* — Noah James Sugden
(74) *Attorney, Agent, or Firm* — Barta Jones, PLLC

(57) ABSTRACT

Disclosed is a method comprising receiving a cell discontinuous transmission, DTX, configuration for a cell, the cell DTX configuration indicating one or more cell DTX non-active periods of the cell; obtaining at least one uplink grant configuration to be applied for one or more uplink data transmissions during the one or more DTX non-active periods of the cell; determining, based on the at least one uplink grant configuration, an uplink grant for the one or more uplink data transmissions; and transmitting the one or more uplink data transmissions using the determined uplink grant during the one or more cell DTX non-active periods.

6 Claims, 10 Drawing Sheets

(56) References Cited

OTHER PUBLICATIONS

WO PCT Application No. PCT/CN2022/090007, "Method, Apparatus and Computer Program", filed on Apr. 28, 2022, pp. 1-42.
U.S. Appl. No. 63/448,028, "Slot or Symbol Reclassification for Dynamically Adapted Spatial Elements", filed Feb. 24, 2023, pp. 1-56.
"Discussion on cell DTX/DTX mechanism", 3GPP TSG RAN WG1 #112, R1-2300753, Agenda: 9.7.2, Fujitsu, Feb. 27-Mar. 3, 2023, 4 pages.
"Cell DTX/DRX NES Techniques", 3GPP TSG-RAN WG2 Meeting #121bis-e, R2-2302914, Agenda: 7.3.2, Qualcomm Incorporated, Apr. 17-May 12, 2023, 11 pages.
"Cell DTX/DRX mechanism for network energy saving", 3GPP TSG-RAN WG1 Meeting #112bis-e, R1-2302338, Agenda: 9.7.2, Huawei, Apr. 17-26, 2023, 6 pages.
"3rd Generation Partnership Project; Technical Specification Group Radio Access Network; NR; Radio Resource Control (RRC) protocol specification (Release 17)", 3GPP TS 38.331, V17.4.0, Mar. 2023, pp. 1-1324.
"IEEE 802.11", Wikipedia, Retrieved on Jun. 7, 2023, Webpage available at : https://en.wikipedia.org/wiki/IEEE_802.11.
"IEEE 802.15", Wikipedia, Retrieved on Jun. 7, 2023, Webpage available at : https://en.wikipedia.org/wiki/IEEE_802.15.
International Search Report and Written Opinion received for corresponding Patent Cooperation Treaty Application No. PCT/EP2024/059470, dated Jun. 13, 2024, 11 pages.
"DTX/DRX for Network Energy Saving", 3GPP TSG RAN WG1 #112, R1-2300693, Agenda: 9.7.2, CATT, Feb. 27-Mar. 3, 2023, 7 pages.
"Report of [301][NES] Summary of DTX/DRX—8.3.2", 3GPP RAN WG2 Meeting #120, R2-221xxxx, Agenda: 8.3.2, InterDigital, Nov. 14-19, 2022, 8 pages.
"Discussion on cell DTX/DRX", 3GPP TSG-RAN WG2 Meeting #121bis-e, R2-2303792, Agenda: 7.3.2, CMCC, Apr. 17-26, 2023, 5 pages.

* cited by examiner

DETERMINING UPLINK GRANT DURING CELL DISCONTINUOUS TRANSMISSION

TECHNICAL FIELD

The following example embodiments relate to wireless communication.

BACKGROUND

In a wireless communication network, most of the energy may be consumed by the radio access network. As energy resources are limited, it is desirable to provide techniques to save energy in the radio access network.

BRIEF DESCRIPTION

The scope of protection sought for various example embodiments is set out by the claims. The example embodiments and features, if any, described in this specification that do not fall under the scope of the claims are to be interpreted as examples useful for understanding various embodiments.

According to an aspect, there is provided an apparatus comprising at least one processor, and at least one memory storing instructions that, when executed by the at least one processor, cause the apparatus at least to: receive a cell discontinuous transmission, DTX, configuration for a cell, the cell DTX configuration indicating one or more cell DTX non-active periods of the cell; obtain at least one uplink grant configuration to be applied for one or more uplink data transmissions during the one or more DTX non-active periods of the cell; determine, based on the at least one uplink grant configuration, an uplink grant for the one or more uplink data transmissions; and transmit the one or more uplink data transmissions using the determined uplink grant during the one or more cell DTX non-active periods.

According to another aspect, there is provided an apparatus comprising: means for receiving a cell discontinuous transmission, DTX, configuration for a cell, the cell DTX configuration indicating one or more cell DTX non-active periods of the cell; means for obtaining at least one uplink grant configuration to be applied for one or more uplink data transmissions during the one or more DTX non-active periods of the cell; means for determining, based on the at least one uplink grant configuration, an uplink grant for the one or more uplink data transmissions; and means for transmitting the one or more uplink data transmissions using the determined uplink grant during the one or more cell DTX non-active periods.

According to another aspect, there is provided a method comprising: receiving a cell discontinuous transmission, DTX, configuration for a cell, the cell DTX configuration indicating one or more cell DTX non-active periods of the cell; obtaining at least one uplink grant configuration to be applied for one or more uplink data transmissions during the one or more DTX non-active periods of the cell; determining, based on the at least one uplink grant configuration, an uplink grant for the one or more uplink data transmissions; and transmitting the one or more uplink data transmissions using the determined uplink grant during the one or more cell DTX non-active periods.

According to another aspect, there is provided a computer program comprising instructions which, when executed by an apparatus, cause the apparatus to perform at least the following: receiving a cell discontinuous transmission, DTX, configuration for a cell, the cell DTX configuration indicating one or more cell DTX non-active periods of the cell; obtaining at least one uplink grant configuration to be applied for one or more uplink data transmissions during the one or more DTX non-active periods of the cell; determining, based on the at least one uplink grant configuration, an uplink grant for the one or more uplink data transmissions; and transmitting the one or more uplink data transmissions using the determined uplink grant during the one or more cell DTX non-active periods.

According to another aspect, there is provided a computer readable medium comprising program instructions which, when executed by an apparatus, cause the apparatus to perform at least the following: receiving a cell discontinuous transmission, DTX, configuration for a cell, the cell DTX configuration indicating one or more cell DTX non-active periods of the cell; obtaining at least one uplink grant configuration to be applied for one or more uplink data transmissions during the one or more DTX non-active periods of the cell; determining, based on the at least one uplink grant configuration, an uplink grant for the one or more uplink data transmissions; and transmitting the one or more uplink data transmissions using the determined uplink grant during the one or more cell DTX non-active periods.

According to another aspect, there is provided a non-transitory computer readable medium comprising program instructions which, when executed by an apparatus, cause the apparatus to perform at least the following: receiving a cell discontinuous transmission, DTX, configuration for a cell, the cell DTX configuration indicating one or more cell DTX non-active periods of the cell; obtaining at least one uplink grant configuration to be applied for one or more uplink data transmissions during the one or more DTX non-active periods of the cell; determining, based on the at least one uplink grant configuration, an uplink grant for the one or more uplink data transmissions; and transmitting the one or more uplink data transmissions using the determined uplink grant during the one or more cell DTX non-active periods.

According to another aspect, there is provided an apparatus comprising at least one processor, and at least one memory storing instructions that, when executed by the at least one processor, cause the apparatus at least to: transmit a cell discontinuous transmission, DTX, configuration for a cell, the cell DTX configuration indicating one or more cell DTX non-active periods of the cell; obtain at least one uplink grant configuration to be applied for one or more uplink data transmissions during the one or more DTX non-active periods of the cell; determine, based on the at least one uplink grant configuration, an uplink grant for the one or more uplink data transmissions; and receive the one or more uplink data transmissions using the determined uplink grant during the one or more cell DTX non-active periods.

According to another aspect, there is provided an apparatus comprising: means for transmitting a cell discontinuous transmission, DTX, configuration for a cell, the cell DTX configuration indicating one or more cell DTX non-active periods of the cell; means for obtaining at least one uplink grant configuration to be applied for one or more uplink data transmissions during the one or more DTX non-active periods of the cell; means for determining, based on the at least one uplink grant configuration, an uplink grant for the one or more uplink data transmissions; and means for receiving the one or more uplink data transmissions using the determined uplink grant during the one or more cell DTX non-active periods.

According to another aspect, there is provided a method comprising: transmitting a cell discontinuous transmission, DTX, configuration for a cell, the cell DTX configuration indicating one or more cell DTX non-active periods of the cell; obtaining at least one uplink grant configuration to be applied for one or more uplink data transmissions during the one or more DTX non-active periods of the cell; determining, based on the at least one uplink grant configuration, an uplink grant for the one or more uplink data transmissions; and receiving the one or more uplink data transmissions using the determined uplink grant during the one or more cell DTX non-active periods.

According to another aspect, there is provided a computer program comprising instructions which, when executed by an apparatus, cause the apparatus to perform at least the following: transmitting a cell discontinuous transmission, DTX, configuration for a cell, the cell DTX configuration indicating one or more cell DTX non-active periods of the cell; obtaining at least one uplink grant configuration to be applied for one or more uplink data transmissions during the one or more DTX non-active periods of the cell; determining, based on the at least one uplink grant configuration, an uplink grant for the one or more uplink data transmissions; and receiving the one or more uplink data transmissions using the determined uplink grant during the one or more cell DTX non-active periods.

According to another aspect, there is provided a computer readable medium comprising program instructions which, when executed by an apparatus, cause the apparatus to perform at least the following: transmitting a cell discontinuous transmission, DTX, configuration for a cell, the cell DTX configuration indicating one or more cell DTX non-active periods of the cell; obtaining at least one uplink grant configuration to be applied for one or more uplink data transmissions during the one or more DTX non-active periods of the cell; determining, based on the at least one uplink grant configuration, an uplink grant for the one or more uplink data transmissions; and receiving the one or more uplink data transmissions using the determined uplink grant during the one or more cell DTX non-active periods.

According to another aspect, there is provided a non-transitory computer readable medium comprising program instructions which, when executed by an apparatus, cause the apparatus to perform at least the following: transmitting a cell discontinuous transmission, DTX, configuration for a cell, the cell DTX configuration indicating one or more cell DTX non-active periods of the cell; obtaining at least one uplink grant configuration to be applied for one or more uplink data transmissions during the one or more DTX non-active periods of the cell; determining, based on the at least one uplink grant configuration, an uplink grant for the one or more uplink data transmissions; and receiving the one or more uplink data transmissions using the determined uplink grant during the one or more cell DTX non-active periods.

LIST OF DRAWINGS

In the following, various example embodiments will be described in greater detail with reference to the accompanying drawings, in which FIG. 1 illustrates an example of a wireless communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Some example embodiments described herein may be implemented in a wireless communication network comprising a radio access network based on one or more of the following radio access technologies: Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications.

Figure 1:
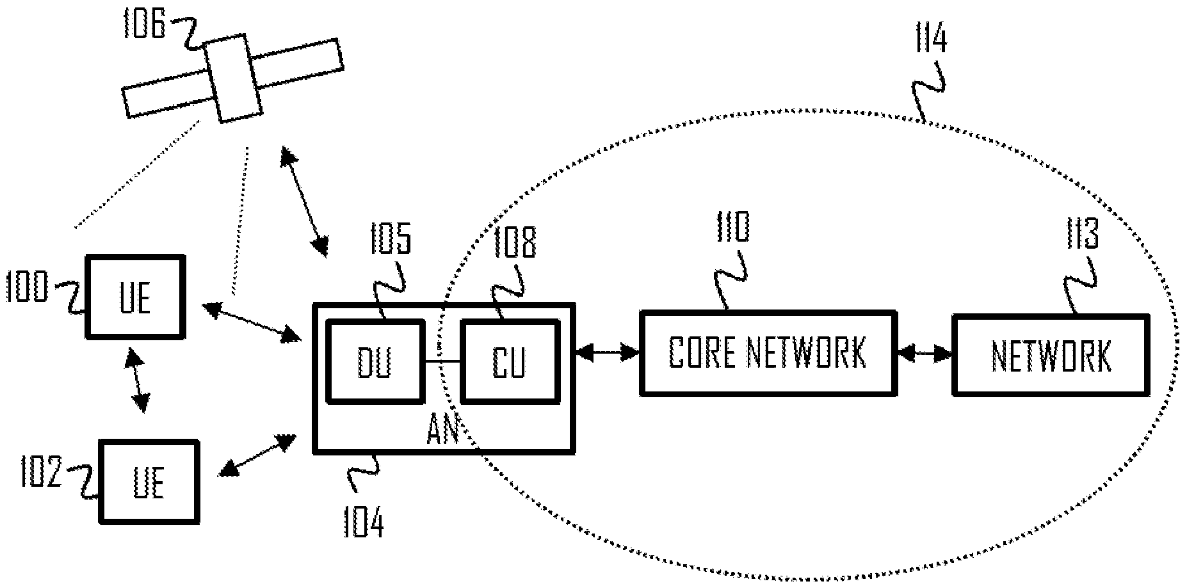

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the embodiments described herein to other wireless communication networks provided with necessary properties.

The example wireless communication network shown in FIG. 1 includes an access network, such as a radio access network (RAN), and a core network 110.

FIG. 1 shows user equipment (UE) 100, 102 configured to be in a wireless connection on one or more communication channels in a radio cell with an access node (AN) 104 of an access network. The AN 104 may be an evolved NodeB (abbreviated as eNB or eNodeB), or a next generation evolved NodeB (abbreviated as ng-eNB), or a next generation NodeB (abbreviated as gNB or gNodeB), providing the radio cell. The wireless connection (e.g., radio link) from a UE to the access node 104 may be called uplink (UL) or reverse link, and the wireless connection (e.g., radio link) from the access node to the UE may be called downlink (DL) or forward link. UE 100 may also communicate directly with UE 102, and vice versa, via a wireless connection generally referred to as a sidelink (SL). It should be appreciated that the access node 104 or its functionalities may be implemented by using any node, host, server or access point etc. entity suitable for providing such functionalities.

The access network may comprise more than one access node, in which case the access nodes may also be configured to communicate with one another over links, wired or wireless. These links between access nodes may be used for sending and receiving control plane signaling and also for routing data from one access node to another access node.

The access node may comprise a computing device configured to control the radio resources of the access node. The access node may also be referred to as a base station, a base transceiver station (BTS), an access point, a cell site, a radio access node or any other type of node capable of being in a wireless connection with a UE (e.g., UEs 100, 102). The access node may include or be coupled to transceivers. From the transceivers of the access node, a connection may be provided to an antenna unit that establishes bi-directional radio links to UEs 100, 102. The antenna unit may comprise an antenna or antenna element, or a plurality of antennas or antenna elements.

The access node 104 may further be connected to a core network (CN) 110. The core network 110 may comprise an evolved packet core (EPC) network and/or a $5^{th}$ generation core network (5GC). The EPC may comprise network entities, such as a serving gateway (S-GW for routing and forwarding data packets), a packet data network gateway (P-GW) for providing connectivity of UEs to external packet data networks, and a mobility management entity (MME). The 5GC may comprise network functions, such as a user plane function (UPF), an access and mobility management function (AMF), and a location management function (LMF).

The core network 110 may also be able to communicate with one or more external networks 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device just to mention but a few names. The UE may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or any computing device comprising a wireless modem integrated in a vehicle.

It should be appreciated that a UE may also be a nearly exclusive uplink-only device, of which an example may be a camera or video camera loading images or video clips to a network. A UE may also be a device having capability to operate in an Internet of Things (IoT) network, which is a scenario in which objects may be provided with the ability to transfer data over a network without requiring human-to-human or human-to-computer interaction. The UE may also utilize cloud. In some applications, the computation may be carried out in the cloud or in another UE.

The wireless communication network may also be able to support the usage of cloud services, for example at least part of core network operations may be carried out as a cloud service (this is depicted in FIG. 1 by "cloud" 114). The wireless communication network may also comprise a central control entity, or the like, providing facilities for wireless communication networks of different operators to cooperate for example in spectrum sharing.

5G enables using multiple input—multiple output (MIMO) antennas in the access node 104 and/or the UE 100, 102, many more base stations or access nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine type applications, such as (massive) machine-type communications (mMTC), including vehicular safety, different sensors and real-time control.

In 5G wireless communication networks, access nodes and/or UEs may have multiple radio interfaces, namely below 6 GHz, cmWave and mmWave, and also being integrable with existing legacy radio access technologies, such as the LTE. Integration with the LTE may be implemented, for example, as a system, where macro coverage may be provided by the LTE, and 5G radio interface access may come from small cells by aggregation to the LTE. In other words, a 5G wireless communication network may support both inter-RAT operability (such as LTE-5G) and inter-RI operability (inter-radio interface operability, such as below 6 GHz—cmWave—mmWave). One of the concepts considered to be used in 5G wireless communication networks may be network slicing, in which multiple independent and dedicated virtual sub-networks (network instances) may be created within the substantially same infrastructure to run services that have different requirements on latency, reliability, throughput and mobility.

In some example embodiments, an access node (e.g., access node 104) may comprise: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such an embodiment of the access node may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be a logical node hosting radio resource control (RRC), service data adaptation protocol (SDAP) and/or packet data convergence protocol (PDCP), of the NR protocol stack for an access node. The DU 105 may be a logical node hosting radio link control (RLC), medium access control (MAC) and/or physical (PHY) layers of the NR protocol stack for the access node. The operations of the DU may be at least partly controlled by the CU. It should also be understood that the distribution of functions between DU 105 and CU 108 may vary depending on implementation. The CU may comprise a control plane (CU-CP), which may be a logical node hosting the RRC and the control plane part of the PDCP protocol of the NR protocol stack for the access node. The CU may further comprise a user plane (CU-UP), which may be a logical node hosting the user plane part of the PDCP protocol and the SDAP protocol of the CU for the access node.

Cloud computing systems may also be used to provide the CU 108 and/or DU 105. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the access network (e.g., RAN) by utilizing network function virtualization (NFV) and software defined networking (SDN). Using edge cloud may mean access node operations to be carried out, at least partly, in a computing system operationally coupled to a remote radio head (RRH) or a radio unit (RU) of an access node. It is also possible that access node operations may be performed on a distributed computing system or a cloud computing system located at the access node. Application of cloud RAN architecture enables RAN real-time functions being carried out at the access network (e.g., in a DU 105) and non-real-time functions being carried out in a centralized manner (e.g., in a CU 108).

It should also be understood that the distribution of functions between core network operations and access node operations may differ in future wireless communication networks compared to that of the LTE or 5G, or even be non-existent. Some other technology advancements that may be used include big data and all-IP, which may change the way wireless communication networks are being constructed and managed. 5G (or new radio, NR) wireless communication networks may support multiple hierarchies, where multi-access edge computing (MEC) servers may be placed between the core network 110 and the access node 104. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network, enabling more extensive network coverage. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). A given satellite 106 in the mega-constellation may cover several satellite-enabled network entities that create on-ground cells. The on-ground cells may be created through an on-ground relay access node or by an access node 104 located on-ground or in a satellite.

It is obvious for a person skilled in the art that the access node 104 depicted in FIG. 1 is just an example of a part of an access network (e.g., a radio access network) and in practice, the access network may comprise a plurality of access nodes, the UEs 100, 102 may have access to a plurality of radio cells, and the access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of an access network (e.g., a radio access network), a plurality of different kinds of radio cells as well as a plurality of radio cells may be provided. Radio cells may be macro cells (or umbrella cells) which may be large cells having a diameter of up to tens of kilometers, or smaller cells such as micro-, femto- or pico-cells. The access node(s) of FIG. 1 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of access networks, the concept of "plug-and-play" access nodes may be introduced. An access network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's access network, may aggregate traffic from a large number of Home eNodeBs or Home gNodeBs back to a core network of the operator.

In a wireless communication network (e.g., the wireless communication network of FIG. 1), the radio access network (i.e., RAN nodes 104) may consume the largest part of the total energy consumption in the network. For example, the static part of the RAN may consume energy all the time to maintain the necessary operation of the radio access devices, even when the data transmission or reception is not ongoing. As energy resources are limited, it is desirable to provide techniques to save energy in the radio access network.

Some examples of such energy saving techniques include cell discontinuous transmission (DTX) and discontinuous reception (DRX).

In cell DTX, network energy may be saved by switching off radio units (e.g., power amplifier), when there is no transmission to be performed. Along with hardware and software capability improvements, the shutdown of the power amplifier on an orthogonal frequency-division multiplexing (OFDM) symbol basis becomes possible for extended periods of time.

The cell DTX cycle may comprise a cell DTX active period, and a cell DTX non-active period. In a cell DTX non-active period, at least one downlink transmission may be omitted compared to a cell DTX active period. For example, all downlink transmissions except for synchronization signal block (SSB) transmissions may be omitted during a cell DTX non-active period. Herein a cell DTX non-active period may also be referred to as a period of downlink transmission inactivity, and a cell DTX active period may also be referred to as a period of downlink transmission activity.

DRX can be used both in RRC Idle (e.g., when monitoring for paging messages) or RRC Connected mode for UE energy saving. DRX defines active or inactive modes for UE, wherein UE can avoid monitoring all physical downlink control channel (PDCCH) occasions, when it is in the inactive mode. The UE is permitted to transmit on the uplink during the inactive mode, for example by transmitting (a repetition) on the physical uplink shared channel (PUSCH), or sending a scheduling request (SR) to initiate an uplink transmission. The UE may determine whether it is in active or inactive mode based on a set of DRX timers and conditions.

The DTX and DRX configuration may be separate.

A RAN node 104 such as a gNB may obtain energy saving benefits by using cell DTX, but the gain from cell DRX may be more limited. Therefore, the RAN node may use cell DTX more than cell DRX (or the RAN node may only use cell DTX and not use cell DRX at all). This is because receptions do not consume much power, while the RAN node is in a cell DTX non-active period. Therefore, for network energy saving, the RAN node may use cell DTX (by omitting DL transmissions) for longer periods of time (more frequently), and as a consequence there may be fewer PDCCH monitoring occasions (PMO) for the RAN node 104 to use to schedule the UE 100.

For UE with UL data, such data may be transmitted, if the RAN node is not in a cell DRX non-active period. However, in order to prevent waking up the RAN node to transmit the uplink scheduling grant, the RAN node needs to efficiently provide UL scheduling grants to the UE 'upfront' (in advance), i.e., before the RAN node enters cell DTX non-active time periods.

Figure 2:
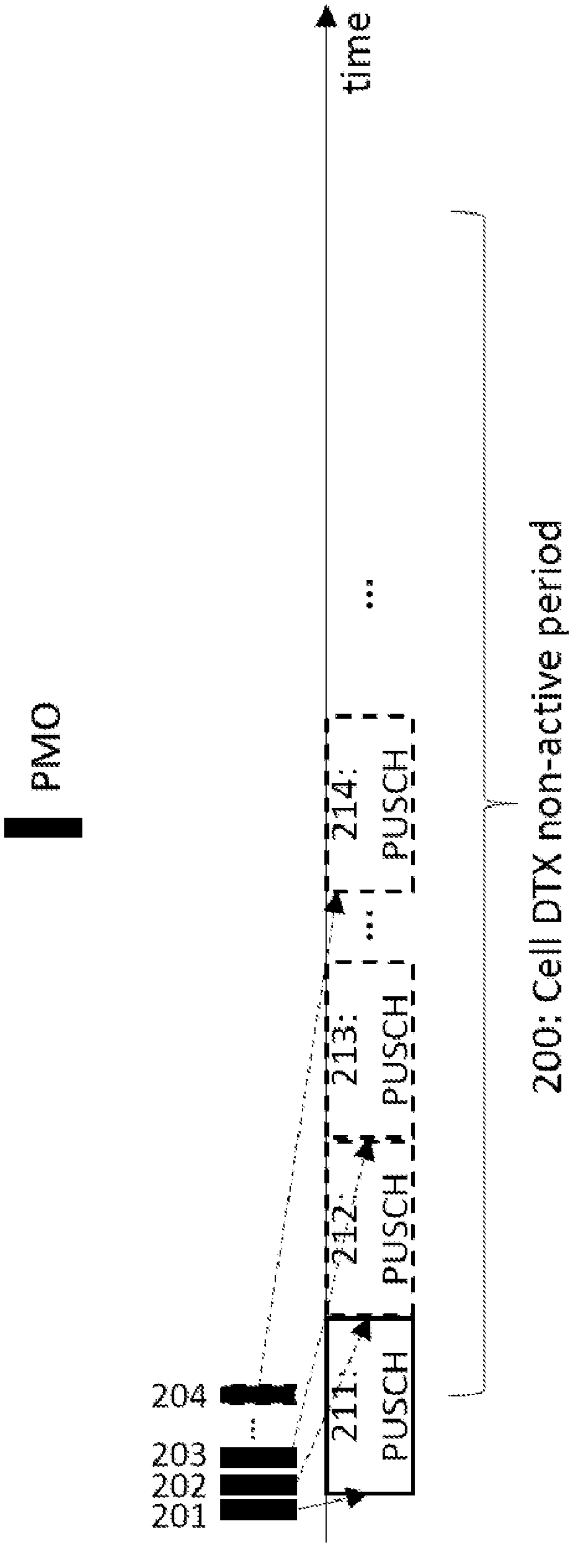
FIG. 2 illustrates an example showing limited scheduling options with a given set of K2 values.

FIG. 2 illustrates an example showing limited scheduling options with a given set of K2 values (slot offset values).

A K2 value specifies the time relationship between the downlink control information (DCI) slot, where the UE receives scheduling information, and the corresponding PUSCH transmission slot. By applying the K2 value as a slot offset, the UE can determine the appropriate PUSCH slot for transmitting its uplink data. In other words, the PUSCH slot number may be calculated by adding the K2 value to the DCI slot number (e.g., PUSCH slot number=DCI slot+K2 slot offset).

Referring to FIG. 2, during the first PMO 201, a first PUSCH repetition bundle 211 (e.g., 8 PUSCH repetitions) may be scheduled (e.g., with K2=2). During the second PMO 202, a second PUSCH repetition bundle 212 (e.g., 8 PUSCH repetitions) may be scheduled (e.g., with K2=2+8−1+12). During the third PMO 203, a third PUSCH repetition bundle 213 (e.g., 8 PUSCH repetitions) may be scheduled (e.g., with K2=2+2*(8−1+12)). During the Nth PMO 204, an Nth repetition bundle 214 (e.g., 8 PUSCH repetitions) may be scheduled (e.g., with K2=2+N*(8−1+12)). The +8 term may apply in an example where there are 8 repetitions, and the +12 may apply in a time-division duplexing (TDD) example, where a subset of the slots are for UL (e.g., PUSCH). The −1 term may apply, for example, if the second PMO 202 is 1 slot after the first PMO 201.

As shown in FIG. 2, although the RAN node can currently select different K2 values and different numbers of repetitions using one (configured) time domain resource allocation (TDRA) table, adding additional options to support the FIG. 2 cell DTX case may add additional rows to the TDRA table. The number of rows (each with a unique set of values) for a given size downlink control information (DCI) is limited. Thus, the values or rows normally needed (before cell DTX was introduced) may not be sufficient in the FIG. 2 cell DTX case, where the cell DTX non-active period 200 may be too long, such that additional K2 values or the maximum number of K2 values in the TDRA table (for the needed number of repetitions) for a desired DCI size (range) may not be sufficient for scheduling in advance for such a long duration. As a result, some mechanism to support additional and/or larger K2 values, which allow indicating larger values of K2 (higher than the current maximum in use during the cell DTX non-active period) to the UE may be needed. However, it is preferable to not make the DCI size and the TDRA table size larger and larger in order to support those yet longer cell DTX non-active periods.

Some example embodiments provide a method to allocate (e.g., during an ongoing cell DTX active period) future UL grants to the UE, which can be applied during future cell DTX non-active periods. In other words, UL grants may be pre-allocated to be applied during a future cell DTX non-active period. This allows support of UL data transfer without the need to exit cell DTX to transmit additional uplink scheduling grants.

Some example embodiments may allow more uplink traffic (if present) to be carried, while the cell is using DTX. For a given amount of time spent in energy saving (e.g., during cell DTX non-active period), some example embodiments allow higher throughput per user on PUSCH. For a given amount of PUSCH load, some example embodiments may allow more time in energy saving (e.g., longer cell DTX non-active period). Furthermore, some example embodiments may help to avoid UE scheduling requests, buffer status reports (BSRs), and returns during the cell DTX non-active periods.

Some example embodiments are described below using principles and terminology of 5G radio access technology without limiting the example embodiments to 5G radio access technology, however.

Figure 3:
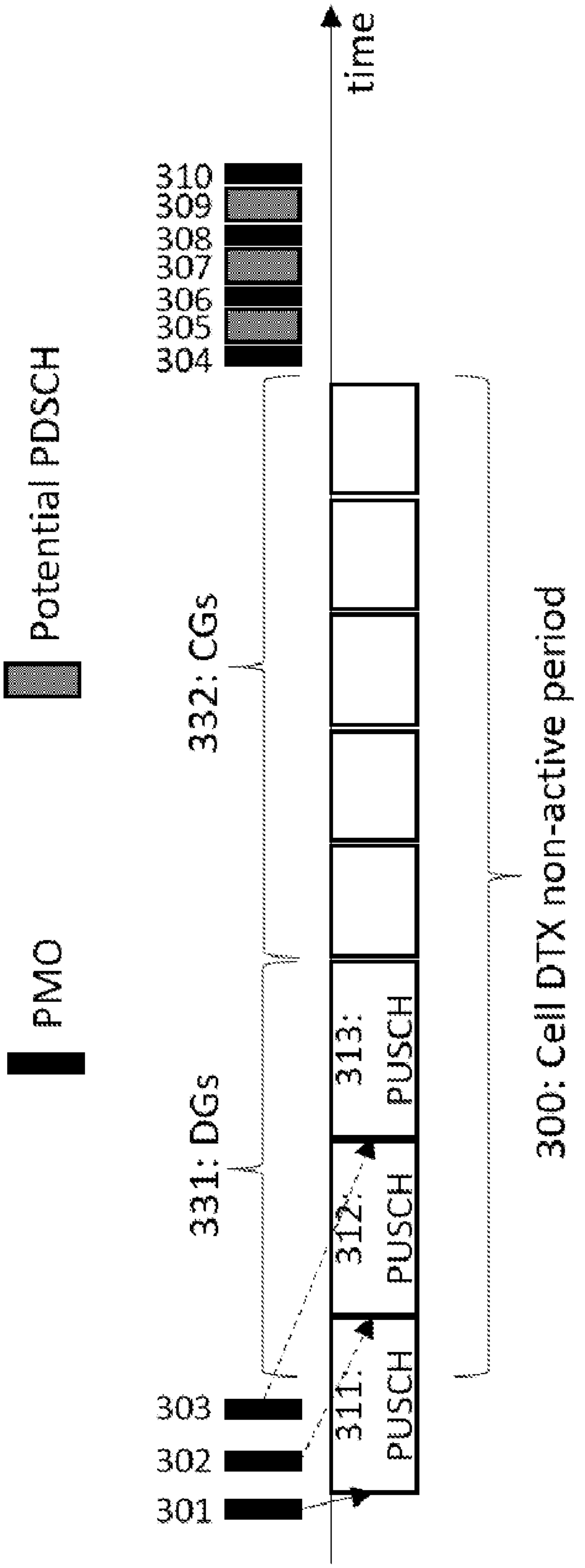
FIG. 3 illustrates an example embodiment.

FIG. 3 illustrates an example embodiment for configured grants (CG) and dynamic grants (DG). Dynamic grants and configured grants refer to different approaches for allocating resources to UEs for uplink data transmission.

Dynamic grants, also known as dynamic resource allocation, involve the real-time allocation of resources by the network (e.g., gNB in 5G NR) to UEs based on their current needs and network conditions. The network dynamically determines and assigns the necessary resources, such as time, frequency, and power, to UEs on a per-transmission basis. In other words, dynamic grants (dynamic scheduling) means that the corresponding scheduling grant is provided dynamically for each allocation or scheduling. Dynamic grants allow for efficient resource utilization and adaptability to changing network conditions and varying UE requirements.

Configured grants, also known as static resource allocation, involve pre-configured or pre-allocated resources assigned to UEs based on pre-defined parameters or settings. The network configures and assigns a fixed set of resources to UEs for their use over a certain period or until the configuration is modified. In other words, configured grant means that the corresponding scheduling grant is pre-configured upfront (in advance). Configured grants provide a deterministic allocation of resources and may be used for dedicated or guaranteed resource assignments to specific UEs or services.

Referring to FIG. 3, during the first PMO 301, a first PUSCH repetition bundle 311 (e.g., 8 PUSCH repetitions) may be scheduled (e.g., with TDRA table K2 value indication for the next unscheduled slot). During the second PMO 302, a second PUSCH repetition bundle 312 (e.g., 8 PUSCH repetitions) may be scheduled (e.g., with TDRA table K2 value for the next unscheduled slot). During the third PMO 303, a third PUSCH repetition bundle 313 (e.g., 8 PUSCH repetitions) may be scheduled (e.g., with TDRA table K2 value for the next unscheduled slot).

During the time period 332, a CG-PUSCH configuration may be automatically activated based on entering the cell DTX non-active period 300. Alternatively, the CG-PUSCH configuration may be automatically activated based on both entering the cell DTX non-active period 300, and based on the UE completing transmission on all PUSCH DGs 331 (dynamic grants) scheduled on the PUSCH. The UE knows when the PUSCH DGs are complete, as the UE received a DCI or DCIs 301, 302, 303 over the PDCCH before entering the cell DTX non-active period 300, where that DCI or DCIs are scheduling the DGs over the PUSCH.

The entering may be defined based on one or more cell DTX related parameters and/or timers. For example, the CG-PUSCH configuration may be activated at the start of the cell DTX non-active period 300 or within a pre-defined threshold time interval before or after the start of the cell DTX non-active period 300. For example, when within some threshold time interval of the upcoming cell DTX non-active period 300 (and/or other period where scheduling reception is paused or allowed to be omitted, for example by PMO gap and/or PUSCH repetitions), the UE may automatically switch to use UL configured grants (to be used during the cell DTX non-active period 300). In other words, in this case, the UE may activate the CG-PUSCH configuration shortly before or after entering the cell DTX non-active period 300.

Thus, UL CG may start automatically during the cell DTX non-active period 300 (when no more DG blocking PUSCH), and UL CG may be paused or suspended during the active downlink transmission intervals and DGs. This allows the UE to use more UL grants or CGs during cell DTX non-active interval, where there are no PMOs. In other words, the UE and the RAN node may determine when to start utilizing the configured grants based upon the determination that the RAN node has entered the cell DTX non-active period 300 (and there are no more dynamic grants scheduled for that UE). In one embodiment, the configured grants may be skippable. In one embodiment, the UE may receive a configuration based on which the UE may determine whether to initiate PDCCH monitoring in a time interval after the UE makes a CG-PUSCH based transmission during a cell DTX non-active period. This allows the network to more quickly provide dynamic grants, when it receives a UE transmission on a CG-PUSCH transmission. In one example, the network decision to start using one or more dynamic grants during a cell DTX non-active period for the given UE may depend on the presence of a buffer status report (BSR) in the CG-PUSCH transmission received from the UE or on the size of the BSR, or the amount of traffic reported in that BSR. In one example, the CG-PUSCH configuration to use during cell DTX non-active period can be configured for the UE to transmit a BSR or a scheduling request.

During the cell DTX non-active period 300 (or 400 or 500 in FIG. 4 or FIG. 5 respectively), the UE may transmit no scheduling requests, or at least less scheduling requests than during the cell DTX active period. For example, when within some threshold time interval of the upcoming cell DTX non-active period 300 (and/or other period where scheduling reception is paused or allowed to be omitted for example by PMO gap and/or PUSCH repetitions), the UE may automatically switch off SR transmission or reduce SR transmissions during the cell DTX non-active period 300.

In other words, during the cell DTX non-active period 300, the SR interval may be automatically switched to be less frequent, or SR transmission may be turned off completely. During the cell DTX non-active period 300, an UL CG may carry uplink traffic without requiring the RAN node to exit cell DTX. However, sending an SR during the cell DTX non-active period 300 would require the RAN node to exit cell DTX (i.e., resume downlink transmissions).

The CG-PUSCH configuration may be deactivated automatically at the end of the cell DTX non-active period 300 upon entering a cell DTX active period, or within some short interval after entering a cell DTX active period (e.g., where this may allow the CG to continue use for a couple slots after entering a cell DTX active period, where DG grants with K2=2 may not have yet begun on the PUSCH).

After the cell DTX non-active period 300, the transmissions from the network (RAN node) resume, and the UE may monitor for PDCCH during the PMOs 304, 306, 308, 310, as well as for PDSCH during the potential PDSCH transmissions 305, 307, 309.

In another example embodiment, the CG-PUSCH configuration may be activated using a PDCCH received from the network (RAN node) in a cell DTX active period (i.e., prior to the cell DTX non-active period 300), but the CG-PUSCH configuration may be automatically deactivated at the end of the cell DTX non-active period 300 upon entering a cell DTX active period.

In another example embodiment, the network (RAN node) may configure at least two CG-PUSCH configurations comprising a first CG-PUSCH configuration and a second CG-PUSCH configuration, wherein the first CG-PUSCH configuration may be used in DTX active period(s), and the second CG-PUSCH configuration may be used in cell DTX non-active period(s) 300. For example, the periodicity of the configured uplink transmission occasions in the second CG-PUSCH configuration may be denser given that there is no chance for being scheduled with a DG in a cell DTX non-active period 300.

FIG. 4A, FIG. 4B, FIG. 4C, and FIG. 5 illustrate some example embodiments that are applicable for dynamic grants.

In the case of TDRA tables (i.e., for dynamic grants) there is an additional step of the RAN node transmitting the DCI scheduling grant to the UE during a scheduling transmission. This step is not needed in the case of CG, wherein the grant is configured upfront (in advance). This scheduling step occurs prior to the step, where the UE transmits a scheduled transmission during the cell DTX non-active period.

In the example embodiments of FIG. 4A, FIG. 4B, FIG. 4C, and FIG. 5, at least one alternate TDRA table dedicated or specific to cell DTX may be defined, wherein this alternate TDRA table (e.g., called Pre_Cell_DTX_TDRA) may comprise or indicate one or more different K2 values and/or repetition values than the legacy TDRA table. When receiving a dynamic grant DCI, the UE may determine, based on one or more pre-defined rules, whether it should apply the legacy TDRA table or the alternate TDRA table specific to cell DTX. The one or more pre-defined rules may include, for example, the length of the time interval to the next cell DTX non-active period, and/or to the next period where scheduling is blocked, for example, by PMO gap and/or PUSCH repetitions.

Alternatively, when within some threshold time interval of the upcoming cell DTX non-active period (and/or other period where scheduling reception is paused or allowed to be omitted for example by PMO gap and/or PUSCH repetitions), the UE may automatically switch to the alternate TDRA table. In other words, in this case, the UE may switch to the alternate TDRA table shortly before entering the cell DTX non-active period.

Alternatively, the UE may be configured with a single TDRA table, where certain row values, for example for K0, indicate that when receiving a dynamic grant DCI, the UE determines, based on the one or more pre-defined rules, which TDRA table entry value(s) to apply.

Figure 4A:
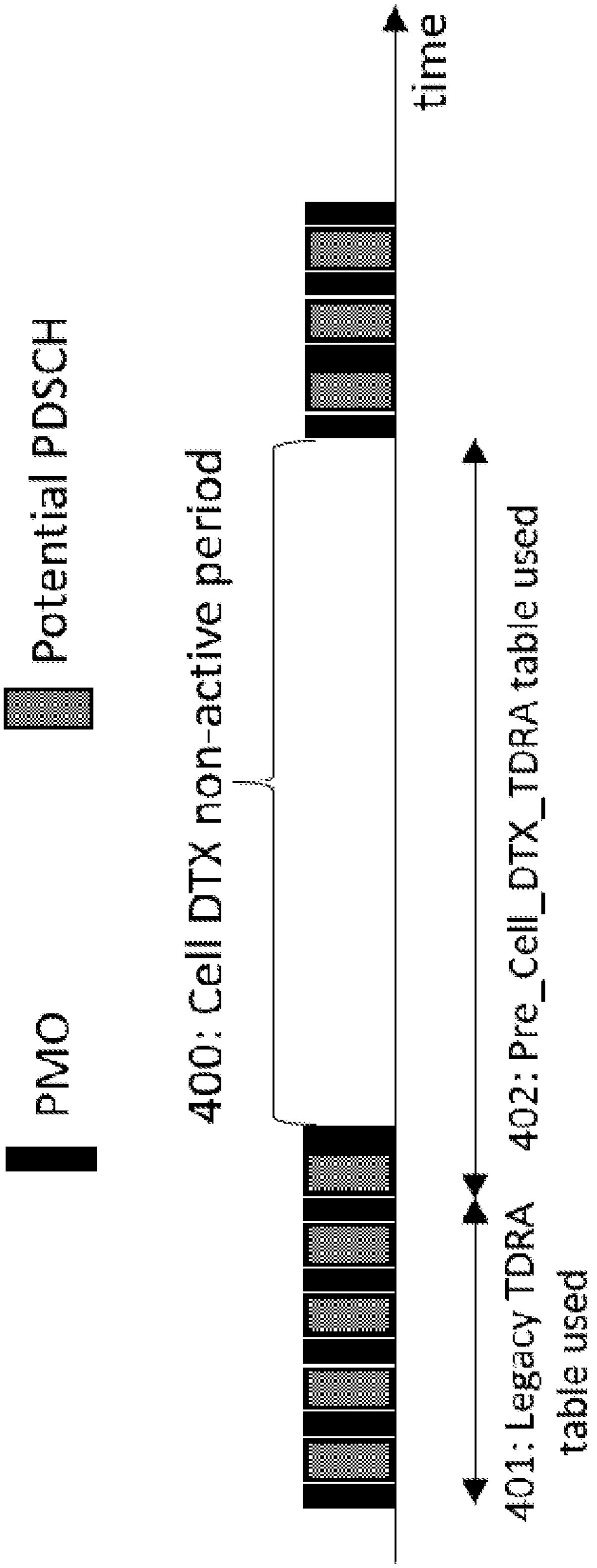
FIG. 4A illustrates an example embodiment.

In FIG. 4A, during the time period 401 (cell DTX activity period), the UE and the RAN node may use the legacy TDRA table (e.g., smaller K2 and/or number of repetition values), when farther away from the start of the cell DTX non-active period 400. At the end of the time period 401, when near the start of the cell DTX non-active period 400, the UE and the RAN node may switch to the alternate TDRA table (e.g., Pre_Cell_DTX_TDRA table) specific to the cell DTX non-active period 400. For example, the UE and the RAN node may switch to the alternate TDRA table based on the number of slots before the next cell DTX non-active period 400 (or PMO), such that PDCCH can schedule more grants whose PUSCH transmission is overlapping with that cell DTX non-active period 400. Thus, during the time period 402, the UE and the RAN node use the alternate TDRA table. The time period 402 includes the cell DTX non-active period 400 and a pre-defined time interval prior to the cell DTX non-active period 400. For example, the alternate TDRA table may comprise larger K2 and/or number of repetition values compared to the legacy TDRA table.

In other words, the UL DG may automatically use different TDRA values (e.g., K2 values) starting from the pre-defined time interval (e.g., last n PMOs) prior to the cell DTX non-active period 400. This allows the UE to use more UL DGs during the cell DTX non-active period 400, where there are no PMOs.

Figure 4B:
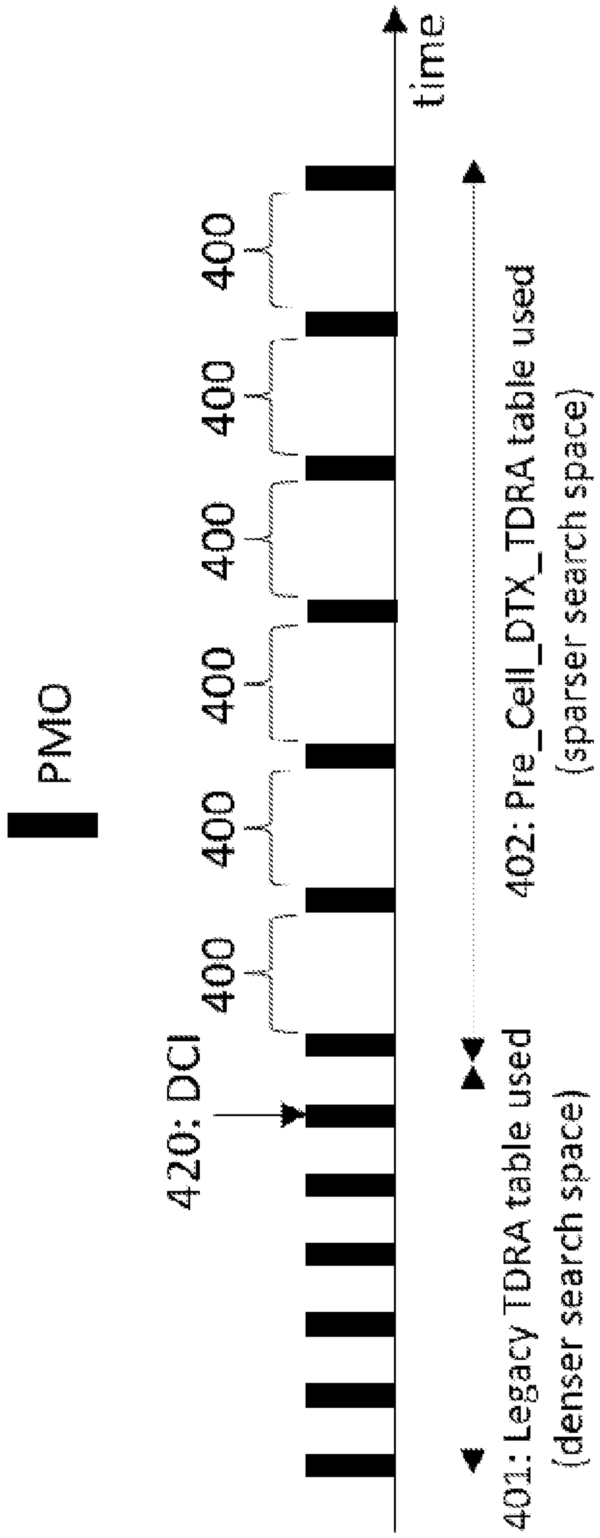
FIG. 4B illustrates an example embodiment.

In FIG. 4B, during the time period 401 (cell DTX activity period), the UE and the RAN node may use the legacy TDRA table (e.g., smaller K2 and/or number of repetition values), and the UE monitors a denser PDCCH search space (e.g., SSSG0), when farther away from the start of the cell DTX non-active period 400. At the end of the time period 401, when near the start of the cell DTX non-active periods 400, the UE and the RAN node may switch to the alternate TDRA table (e.g., Pre_Cell_DTX_TDRA table) specific to the cell DTX non-active periods 400. For example, the UE and the RAN node may switch to the alternate TDRA table based on the number of slots before or between the next one or more PMOs, so that the TDRA values are switched based on search space set group (SSSG) switching (or PMO sparseness), to help fill PUSCH with TDRA values optimized for different SSSG (sparseness or offsets). For example, at 420, DCI transmitted from the RAN node to the UE may trigger the cell DTX and/or the search space switch.

In FIG. 4B, the PMO gap intervals 400 during the time period 402 with sparser PMOs may be considered as cell DTX non-active periods. Thus, during the time period 402, the UE and the RAN node use the alternate TDRA table (e.g., larger K2 and/or number of repetition values), and the UE monitors a sparser PDCCH search space (e.g., SSSG1) compared to the denser PDCCH search space monitored during the time period 401 (i.e., during the cell DTX activity period). The time period 402 comprises less frequent cell DTX and/or search space set group 1 (SSSG1) monitoring occasions compared to the more frequent cell DTX and/or search space set group 0 (SSSG0) monitoring occasions in the time period 401.

In other words, the UL DG may automatically use different TDRA values (e.g., K2 values) starting from the pre-defined time interval before the cell DTX non-active periods 400, for example during a larger PMO gap or during sparse SSSG. In this case, the UE may monitor a sparser PDCCH search space (e.g., a sparser SSSG) (i.e., where less frequent PDCCH monitoring occasions are configured) during the cell DTX non-active periods 400.

The PDCCH search space refers to a specific region within the frequency-time resource grid, where the UE searches for (i.e., monitors) and decodes PDCCH control information, such as downlink scheduling assignments, uplink grant acknowledgments, and other control messages. The PDCCH search space may be defined by a combination of parameters that determine the location and size of the search space.

Figure 4C:
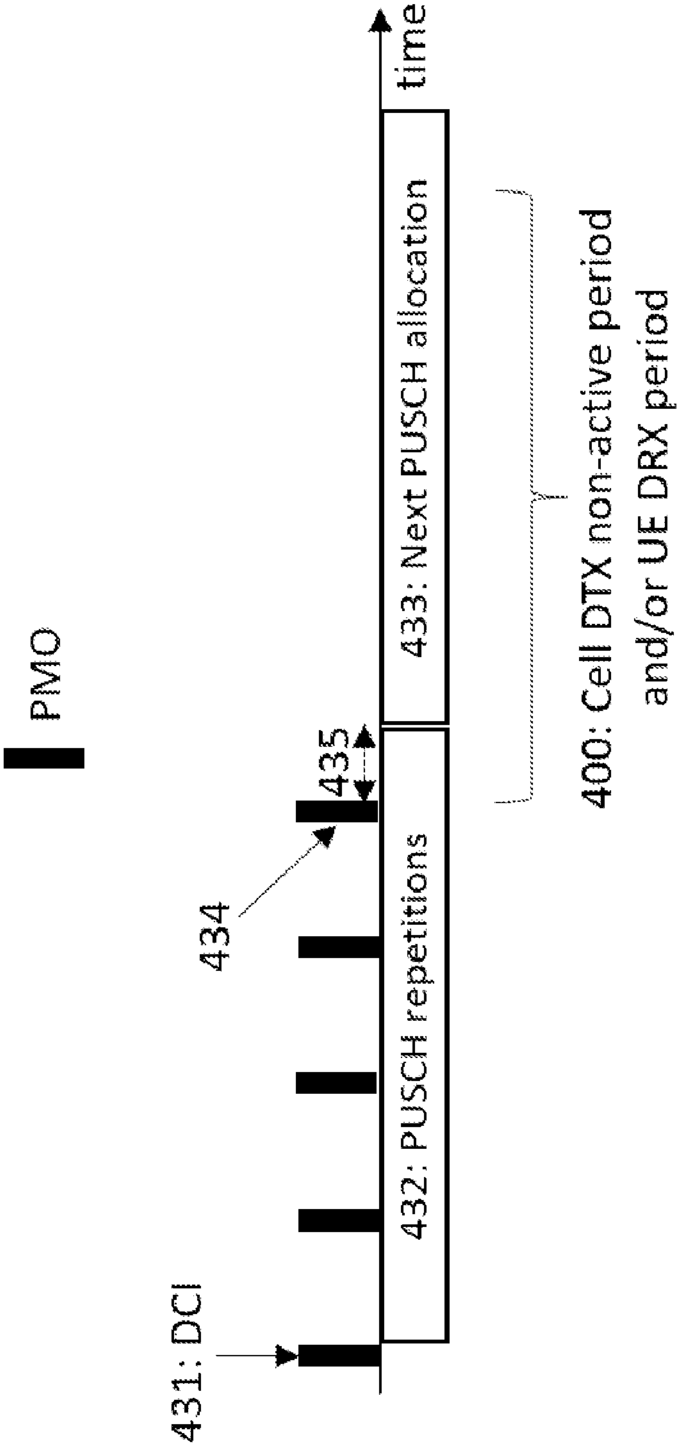
FIG. 4C illustrates an example embodiment.

In FIG. 4C, TDRA values (e.g., K2 and/or number of repetition values) may be switched based on the number of slots before the next cell DTX non-active period 400 (or PMO gap), so that PDCCH can schedule (via DCI 431) the next grant just in time before that cell DTX non-active period 400. At 431, the UE and the RAN node may start to use alternate TDRA values specific to the cell DTX non-active period 400, when near the start of the cell DTX non-active period 400. For example, the UE and the RAN node may use alternate TDRA repetition values, so that the PUSCH repetitions 432 end just in time, so that the last n PMO(s) (e.g., the last PMO 434 within the period 435 (maximum K2 value supported in the TDRA table) to the end of the bundle 432) can schedule the next PUSCH allocation 433 to start (e.g., immediately) after the end of the prior PUSCH repetitions 432.

During the cell DTX non-active period 400, it may also be advantageous to perform granting with numbers of repetitions, possibly in addition to the larger K2 values. During the cell DTX active periods, it is possible to provide, for example, hybrid automatic repeat request (HARQ) negative acknowledgement (NACK) feedback scheduling the next HARQ retransmission (with more repetitions) to the UE after some smaller number of repetitions. However, during the cell DTX non-active periods, this is not the case, so it may be advantageous to perform grants with larger numbers of repetitions during the cell DTX non-active periods.

Thus, the RAN node may decide to use more redundancy and/or repetitions during the cell DTX non-active period 400 and/or when the RAN node is operating on battery backup power, because this may then reduce the need to exit cell DTX in order to trigger retransmissions without delay.

For example, the repetition value may be scaled by a factor (e.g., repetitions=legacy repetitions+B), where B may be configured to be different for different durations of the cell DTX non-active period, or B may be determined by [cell DTX non-active period (in unit of slots)].

Alternatively, or additionally, the RAN node may decide to use skippable or proactive UL grants during the cell DTX non-active period, because this may then reduce the need to the exit the cell DTX in order to trigger retransmissions without delay.

Figure 5:
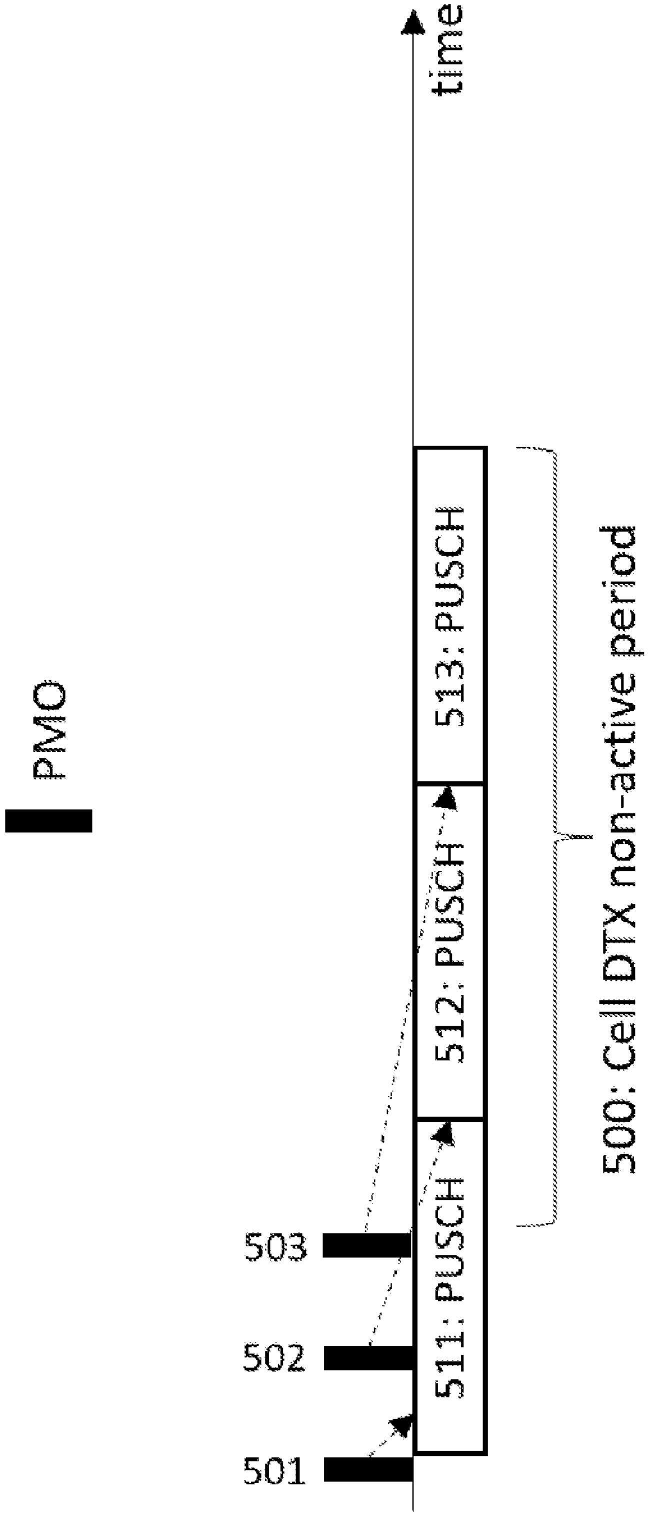
FIG. 5 illustrates an example embodiment.

In other words, in FIG. 5, the UL DG may automatically start to use different TDRA values (e.g., repetitions) during the interval before the cell DTX non-active period 400 or PMO gap interval. For example, the UL DG may automatically start using different (e.g., smaller) TDRA repetition values to avoid the grant extending past the last (n) PMOs before the cell DTX non-active period 400. This allows the last (n) PMOs before the cell DTX non-active period 400 to be used to schedule additional DG during the cell DTX non-active period 400. Thus, the number of repetitions may be dynamically adjusted or reduced to allow the last (n) PMOs before the cell DTX non-active period 400 to be used to schedule additional DG during the cell DTX non-active period 400 (for the given or current K2 value(s)).

Although K2 values are used as an example in the above example embodiments, it should be noted that the above example embodiments may be applied for any other K* values as well, such as K0 and/or K1 values.

In the above example embodiments, the TDRA table entry may be in the K2 column of that row of the TDRA table, where that entry still "indicates" it is providing the number of slots between the DCI conveying the grant and the slot where the transmission is to begin. However, in the example embodiment of FIG. 5, the value in the TDRA table for K2 may not be an explicit integer, but rather a special or reserve K2 value that may be pre-configured by the RAN node to be interpreted by that UE (or UEs) as an indication that the UE should interpret that K2 value entry conveying a K2 value corresponding to the next unscheduled slot, where the UE needs to calculate the actual K2 value to be used (e.g., where it will calculate it to be larger if, e.g., in the prior slot(s) the UE received other similar PUSCH repetition grants that are still underway or pending or not yet complete on the PUSCH).

In FIG. 5, the UE and the RAN node may switch to the alternate TDRA values (e.g., K* and/or number of repetition values) based on the number of busy slots before the next unscheduled slot(s), which are not already scheduled by prior grants, and based on proximity to the cell DTX non-active period 500, such that PDCCH can schedule the next grant overlapping with that cell DTX non-active period 500.

Referring to FIG. 5, during the first PMO 501, a first PUSCH repetition bundle 511 (e.g., 8 PUSCH repetitions) may be scheduled (e.g., with TDRA table K* value for the next unscheduled slot). During the second PMO 502, a second PUSCH repetition bundle 512 (e.g., 8 PUSCH repetitions) may be scheduled (e.g., with TDRA table K* value for the next unscheduled slot). During the third PMO 503, a third PUSCH repetition bundle 513 (e.g., 8 PUSCH repetitions) may be scheduled (e.g., with TDRA table K* value for the next unscheduled slot).

In other words, the UL DG may automatically use different TDRA values (e.g., larger K2 values) during the interval, where PUSCH scheduling is blocked by an already granted PUSCH (repetitions). If DCI grant is lost, then this may help to avoid loss of PUSCH resources, where a subsequent grant is serviced during the prior grant, so that the RAN node can recover with multiple hypothesis decode.

As a summary of FIGS. 4A, 4B, 4C and 5, the UL DG may automatically use different TDRA values (e.g., K2 and/or repetitions) and/or SR values based on the relative timing of one or more of the following limitations: number of slots before the RAN node is expected to enter or exit the cell DTX non-active period 400 (see FIG. 4A); number of slots in PMO gap or before or between PMOs (SSSG group in use) (see FIG. 4B); number of slots before last (n) PMOs (+a maximum K* value) (see FIG. 4C); and/or number of busy slots, before the next unscheduled slot(s) (see FIG. 5).

The size of the K2 values provided may be even larger, if a third SSSG (SSSG2) is used, such that the K2 values provided are scaled to be larger when the interval until the next PMO is larger. For example, in the example embodiment of FIG. 4A, the K2 values supported may be larger in the case where the duration of the cell DTX non-active period 400 is larger, and the period 402 may also start earlier in the case where the duration of the cell DTX non-active period 400 is larger (to allow more cell DTX active time to fill more DG grants into the future).

Figure 6:
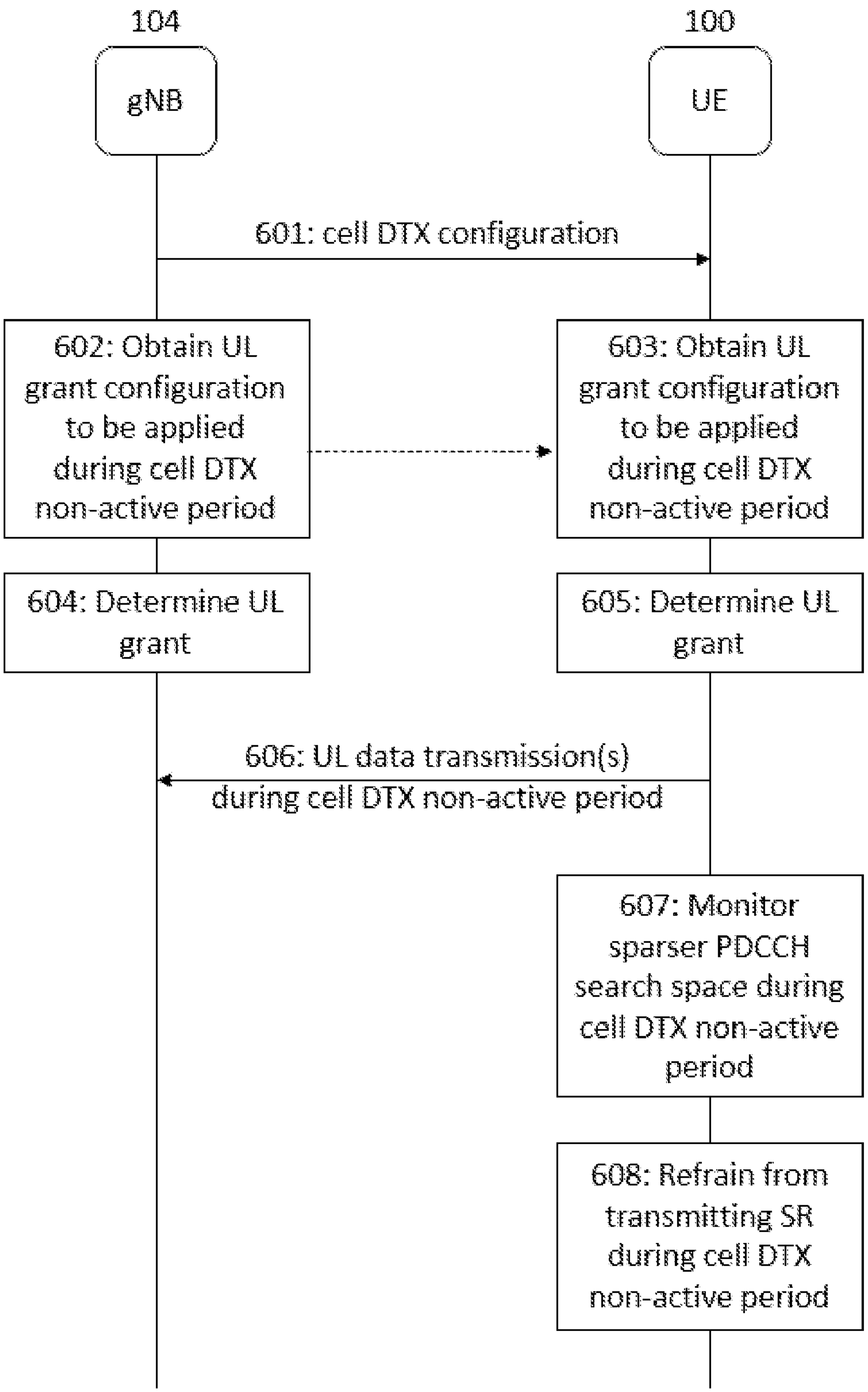
FIG. 6 illustrates a signal flow diagram.

FIG. 6 illustrates a signal flow diagram according to an example embodiment.

Referring to FIG. 6, at 601, a RAN node 104 (e.g., a gNB) transmits, to a UE 100, a cell discontinuous transmission (DTX) configuration for a cell provided by the RAN node. The UE receives the cell DTX configuration. The cell DTX configuration indicates one or more cell DTX non-active periods and/or one or more cell DTX active periods of the cell.

The cell DTX configuration may comprise an indication or one or more rules. The indication or the one or more rules may indicate that, when within a pre-defined threshold time interval of the one or more DTX non-active periods of the cell (or other period where scheduling is blocked, e.g., by a PMO gap and/or PUSCH repetitions) both the UE and the RAN node perform at least one of: switch on (certain) uplink configured grants (e.g., during the cell DTX non-active period, when no more DGs are occupying the PUSCH) (e.g., as described above with reference to FIG. 3); switch off or reduce scheduling requests (i.e., the UE refrains from transmitting scheduling requests in at least some cases, e.g., refrains from transmission of the scheduling request within a timer interval after a previous transmission of the scheduling request) (e.g., as described above with reference to FIG. 3), switch to an alternate TDRA table or to alternate at least a part of TDRA table values (e.g., K2 and/or repetition values) within a single TDRA table (e.g., as described above with reference to FIGS. 4A, 4B, 4C and 5) or add a new TDRA table to allow additional future UL grants during the upcoming cell DTX non-active period (or other period where scheduling is blocked (e.g., PUSCH has already been allocated)).

At 602, the RAN node obtains at least one uplink grant configuration to be applied for one or more uplink data transmissions during the one or more DTX non-active periods of the cell.

The RAN node may transmit at least one uplink grant configuration to the UE during a cell DTX active period of the cell, prior to one or more cell DTX non-active periods.

At 603, the UE obtains at least one uplink grant configuration to be applied for one or more uplink data transmissions during one or more DTX non-active periods of the cell.

The UE may receive the at least one uplink grant configuration from the RAN node during the cell DTX active period, prior to one or more cell DTX non-active periods. Alternatively, at least one uplink grant configuration may already be preconfigured at the UE, or received from another UE via a sidelink.

At least one uplink grant configuration may comprise at least one of: a CG-PUSCH configuration specific to one or more cell DTX non-active periods, a TDRA table specific to one or more cell DTX non-active periods, a scheduling request prohibit timer specific to one or more cell DTX non-active periods (e.g., a longer prohibit timer compared to a prohibit timer used during cell DTX active period), a larger physical uplink control channel (PUCCH) resource periodicity compared to cell DTX active period, and/or a reduced set of logical channels, which are allowed to have an active scheduling request.

At 604, the RAN node determines, based on at least one uplink grant configuration, an uplink grant for one or more uplink data transmissions.

At 605, the UE determines, based on at least one uplink grant configuration, the uplink grant for the one or more uplink data transmissions. The at least one uplink grant configuration may be received from the RAN node or from other UE via a sidelink.

For example, at least one uplink grant configuration may comprise a configured grant physical uplink shared channel (CG-PUSCH) configuration specific to the one or more DTX non-active periods. In this case, determining the uplink grant may mean that the RAN node and the UE activate the CG-PUSCH configuration based at least on entering one of the one or more DTX non-active periods (e.g., as described above with reference to FIG. 3). Alternatively, the RAN node and the UE may activate the CG-PUSCH configuration based on entering one of the one or more cell DTX non-active periods, and based on completing one or more uplink transmissions scheduled by one or more dynamic grants in one of the one or more cell DTX non-active periods. The RAN node and the UE may deactivate the CG-PUSCH configuration based at least on entering a cell DTX active period of the cell (i.e., exiting the cell DTX non-active period).

As another example, the at least one uplink configuration may comprise at least two CG-PUSCH configurations, wherein at least one of the at least two CG-PUSCH configurations is to be applied during the one or more DTX non-active periods of the cell, and another at least one of the at least two CG-PUSCH configurations is to be applied during one or more DTX active periods of the cell. In this case, the activation and deactivation of the at least one of the at least two CG-PUSCH configurations to be applied during the one or more DTX non-active periods of the cell may be performed similarly as described above.

As another example, the at least one uplink grant configuration may comprise information related to a time domain resource allocation (TDRA) table specific to the one or more cell DTX non-active periods (e.g., the Pre_Cell-_DTX_TDRA table described above). In this case, determining the uplink grant may mean determining, based on the one or more pre-defined rules, whether to apply the TDRA table specific to the one or more cell DTX non-active periods (e.g., as described above with reference to FIGS. 4A, 4B, 4C, and 5). For example, the one or more pre-defined rules may indicate to use the TDRA table specific to the one or more cell DTX non-active periods, if a time interval to a next cell DTX non-active period or to a time period during which scheduling is blocked (e.g., by PMO or PUSCH repetitions) is within a threshold. The one or more pre-defined rules may be indicated in the cell DTX configuration.

As another example, the at least one uplink grant configuration may comprise information related to a TDRA table (e.g., the single TDRA table described above) comprising a plurality of values, wherein a subset of the plurality of values is specific to the one or more cell DTX non-active periods (and another subset may be applied during cell DTX active period). In this case, the RAN node and the UE may determine, based on one or more pre-defined rules, whether to apply the subset of the plurality of values, wherein the one or more pre-defined rules indicate to apply the subset of the plurality of values, if a time interval to a next cell DTX non-active period or to a time period during which scheduling is blocked is within a threshold (e.g., as described above with reference to FIGS. 4A, 4B, 4C and 5). The one or more pre-defined rules may be indicated in the cell DTX configuration.

As another example, the at least one uplink grant configuration may comprise information related to a TDRA table, which is interpreted differently between cell DTX active and non-active periods. In this case, the RAN node and the UE may determine whether a scheduling (or scheduling slot) of the one or more uplink data transmissions occurs within a pre-defined time interval prior to a next cell DTX non-active period of the cell. Based on determining that the scheduling (or scheduling slot) of the one or more uplink data transmissions occurs within the pre-defined time interval, the RAN node and the UE may interpret one or more slot offset values (i.e., K2 values) of the TDRA table differently compared to if the scheduling (or scheduling slot) of the one or more uplink data transmissions would not occur within the pre-defined time interval. The one or more uplink data transmissions may then be transmitted based on the interpretation of the one or more slot offset values. The scheduling slot refers to the DCI slot, where the scheduling DCI (dynamic grant) is sent over the PDCCH In other words, in the above example (applicable for DG), when cell DTX is used and if a PDCCH includes a DCI (dynamic grant) during a cell DTX active period, where that grant schedules PUSCH for a cell DTX non-active period, the K2 value may be interpreted differently compared to how it is interpreted during earlier cell DTX active periods. As an example, the K2 value may be counted starting from the first slot of the cell DTX non-active period (e.g., PUSCH slot number=first slot of cell DTX non-active period+K2 slot offset), instead of the first slot after the scheduling PDCCH (e.g., PUSCH slot number=DCI slot+K2 slot offset). As another alternative, the K2 value may be counted only on an uplink slot when cell DTX is used. In yet another alternative, the K2 value may be scaled by a factor (e.g., K2=legacy_K2+A), where A may be configured to be different for different durations of the cell DTX non-active period, or A may be determined by [cell DTX non-active period (in unit of slots)—K2_max], where K2_max is the maximum supported K2 value.

At 606, the UE transmits the one or more uplink data transmissions using the determined uplink grant during the one or more DTX non-active periods of the cell. The RAN node receives the one or more uplink data transmission from the UE.

At 607, the UE may monitor, during or amongst the one or more cell DTX non-active periods, a sparser physical downlink control channel (PDCCH) search space compared to a physical downlink control channel search space monitored during one or more cell DTX active periods (e.g., as shown in FIG. 4B). The cell DTX configuration may indicate the sparser physical downlink control channel search space. For example, referring to FIG. 4B, the monitoring of the sparser PDCCH search space may occur during the time period 402, which comprises the cell DTX non-active periods 400 (i.e., PMO gap intervals in this case).

At 608, the UE may refrain from transmitting a scheduling request (SR) during the one or more cell DTX non-active periods.

For example, the refraining may be based at least on a prohibit timer (sr-ProhibitTimer), wherein a value of the prohibit timer indicates a time period during which a transmission of the scheduling request is prohibited after a previous transmission of the scheduling request. The value of the prohibit timer applied during the one or more cell DTX non-active periods of the cell may be larger than a value of a prohibit timer applied during one or more cell DTX active periods of the cell. The prohibit timer to be applied during the one or more cell DTX non-active periods may be indicated in the cell DTX configuration.

Alternatively, or additionally, the refraining may be based at least on a larger physical uplink control channel resource periodicity during the one or more cell DTX non-active periods compared to a physical uplink control channel resource periodicity during one or more cell DTX active periods of the cell. The larger physical uplink control channel resource periodicity may be indicated in the cell DTX configuration.

Alternatively, or additionally, the refraining may be based at least on a logical channel identifier associated with the one or more cell DTX non-active periods. For example, the refraining may be based on a smaller set of logical channels that are allowed to have an active scheduling request during the one or more DTX non-active periods of the cell, compared to a set of logical channels that are allowed to have an active scheduling request during one or more one or more cell DTX active periods of the cell. The logical channel identifier or the smaller set of logical channels may be indicated in the cell DTX configuration.

In other words, the SR transmission and/or retransmission configuration may automatically, during a cell DTX non-active period, perform at least one of: use a larger sr-ProhibitTimer; and/or use a larger PUCCH resource periodicity (where no CG), so as to reduce the frequency of SR reporting opportunities; and/or reduce the set of logical channels (LCHs), which are allowed to have an active SR.

The sr-ProhibitTimer prevents the UE from sending an SR within a certain time duration (as defined by the value of the timer) after having already sent a scheduling request.

In the case where the CG is automatically configured during cell DTX, then expected SR usage by the UE may be reduced with UE transmission on CG, instead of SR. As such, reducing the number of SR transmission opportunities may be less relevant in this case.

However, reducing the number of SR transmission opportunities may still have an impact of reducing reception processing at the RAN node, and/or simplifying scheduling or reception processing with respect to PUSCH repetitions across slots (with or without PUCCH or SR).

The SR prohibit timer (e.g., called sr-ProhibitTimerForCellDTX, or sr-ProhibitTimerMultiplierForCellDTX) may be automatically lengthened during the one or more cell DTX non-active periods.

It may be "less appropriate" for the UE to send another SR quickly during the cell DTX non-active period (with or without CG) because of the higher likelihood that, during the cell DTX non-active period, although the RAN node heard the SR, the RAN node may be ignoring the SR and/or is waiting longer before exiting the cell DTX to support the UE, given the network energy saving needs associated with that cell DTX state.

Lengthening the SR prohibit timer may thus prevent extra or unnecessary SR transmission for example via physical uplink control channel (PUCCH) or random access channel (RACH).

Alternatively, the SR retransmission may be completely forbidden or prohibited during the cell DTX non-active period.

In one example, the RAN node may configure a longer SR prohibit timer (e.g. with sr-ProhibitTimerForCellDTX) to adapt that value during the one or more cell DTX non-active periods.

As another example, the UE may automatically lengthen the SR prohibit timer (e.g., sr-ProhibitTimerMultiplierForCellDTX) during the one or more cell DTX non-active periods.

As another example, the UE may automatically apply the SR prohibit timer (e.g., with sr-ProhibitTimerForCellDTX) regardless of its value until the end of the cell DTX non-active period.

As another example, the UE may automatically disable the SR retransmission regardless of the value of the SR prohibit timer.

As another example, the sr-ProhibitTimerForCellDTX value may be very large, or indicate that the prohibit timer lasts until the end of the cell DTX non-active period, or until a threshold interval or number of PMOs elapse during the subsequent cell DTX non-active period(s), thus prohibiting all SR retransmissions during the cell DTX non-active period.

Figure 7:
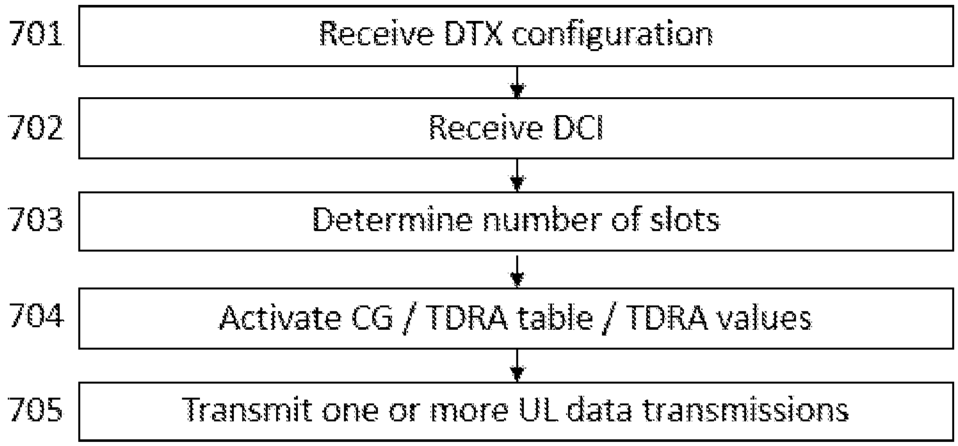
FIG. 7 illustrates a flow chart.

FIG. 7 illustrates a flow chart according to an example embodiment of a method performed by an apparatus 1000. For example, the apparatus 1000 may be, or comprise, or be comprised in, a user equipment (UE) 100, 102.

In this example embodiment, the apparatus (UE) may be preconfigured by a RAN node 104 with one or more TDRA table values (e.g., K0 and/or K2 values).

Referring to FIG. 7, in block 701, the apparatus receives, from the RAN node 104 (e.g., a gNB), a cell discontinuous transmission (DTX) configuration for a cell provided by the RAN node. The cell DTX configuration indicates one or more cell DTX non-active periods and/or one or more cell DTX active periods of the cell.

The cell DTX configuration may comprise an indication or one or more rules. The indication or the one or more rules may indicate that, when within a pre-defined threshold time interval of the one or more DTX non-active periods of the cell (or other period where scheduling is blocked, e.g., by a PMO gap and/or PUSCH repetitions) both the UE and the RAN node perform at least one of: switch on uplink configured grants (e.g., during the cell DTX non-active period, when no more DGs are occupying the PUSCH) (e.g., as described above with reference to FIG. 3); switch off or reduce scheduling requests (i.e., the UE refrains from transmitting scheduling requests) (e.g., as described above with reference to FIG. 3), switch to an alternate TDRA table or to alternate TDRA table values (e.g., K2 and/or repetition values) within a single TDRA table (e.g., as described above with reference to FIGS. 4A, 4B, 4C and 5) to allow additional future UL grants during the upcoming cell DTX non-active period (or other period where scheduling is blocked).

In block 702, the apparatus receives, from the RAN node, downlink control information (DCI) on the PDCCH for scheduling a PUSCH transmission. In other words, the RAN node schedules a PUSCH transmission with the DCI on the PDCCH.

In block 703, the apparatus determines at least one of: a number of slots until the cell is expected to enter or exit a cell DTX non-active period; a number of slots until the next PMO or between PMOs (SSSG group in use) (see FIG. 4B); a number of slots before the last (n) PMOs (+a maximum K* value) before the cell is expected to enter or exit a cell DTX non-active period (see FIG. 4C); a number of busy slots, where upcoming PUSCH scheduling is blocked by already granted PUSCH (see FIG. 5).

In block 704, the apparatus determines, based on the number of slots determined in block 703 (and/or the one or more rules), to activate at least one of: a CG-PUSCH configuration, a TDRA table, one or more TDRA values (e.g., K2, K1, K0, and/or number of repetitions) or an additional TDRA table. For example, the apparatus may activate or switch to a CG-PUSCH configuration or TDRA table or one or more TDRA values specific to the one or more cell DTX non-active periods. Alternatively, or additionally, the apparatus may deactivate or reduce scheduling request transmissions.

In block 705, the apparatus transmits one or more uplink data transmissions by applying the activated at least one of: the CG-PUSCH configuration, the TDRA table, or the one or more TDRA values.

Figure 8:
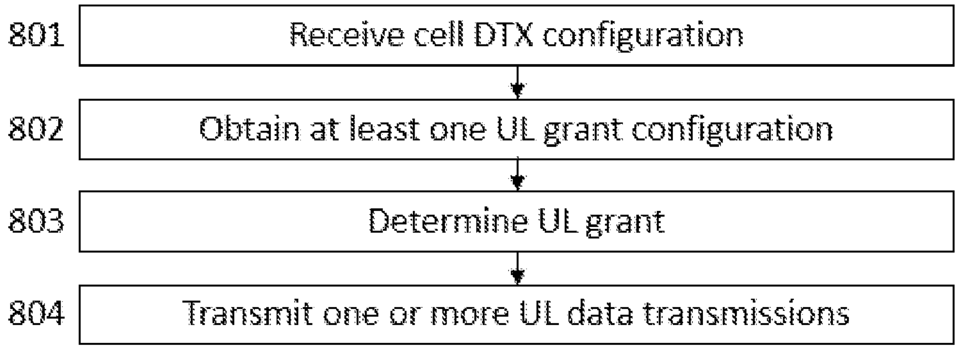
FIG. 8 illustrates a flow chart.

FIG. 8 illustrates a flow chart according to an example embodiment of a method performed by an apparatus 1000. For example, the apparatus 1000 may be, or comprise, or be comprised in, a user equipment (UE) 100, 102.

Referring to FIG. 8, in block 801, the apparatus receives a cell discontinuous transmission (DTX) configuration for a cell, the cell DTX configuration indicating one or more cell DTX non-active periods of the cell. Herein the term "cell" refers to a radio cell. The cell DTX configuration may be received from a RAN node 104.

In block 802, the apparatus obtains at least one uplink grant configuration to be applied for one or more uplink data transmissions during the one or more DTX non-active periods of the cell.

In block 803, the apparatus determines, based on the at least one uplink grant configuration, an uplink grant for the one or more uplink data transmissions.

In block 804, the apparatus transmits the one or more uplink data transmissions using the determined uplink grant during the one or more cell DTX non-active periods. The one or more uplink data transmission may be transmitted to the RAN node 104. For example, the one or more uplink data transmissions may comprise one or more physical uplink shared channel (PUSCH) transmissions.

The at least one uplink grant configuration may be received during a cell DTX active period of the cell.

As an example, the at least one uplink grant configuration may comprise a configured grant physical uplink shared channel (CG-PUSCH) configuration. For example, the apparatus may activate the CG-PUSCH configuration based at least on entering one of the one or more DTX non-active periods. As another example, the apparatus may activate the CG-PUSCH configuration based on entering one of the one or more cell DTX non-active periods, and based on completing one or more uplink transmissions scheduled by one or more dynamic grants in the one of the one or more cell DTX non-active periods. The apparatus may deactivate the CG-PUSCH configuration based at least on entering a cell DTX active period of the cell.

As another example, the at least one uplink configuration may comprise at least two CG-PUSCH configurations, wherein at least one of the at least two CG-PUSCH configurations is to be applied during the one or more DTX non-active periods of the cell, and another at least one of the at least two CG-PUSCH configurations is to be applied during one or more DTX active periods of the cell.

As another example, the at least one uplink grant configuration may comprise information related to a time domain resource allocation (TDRA) table specific to the one or more cell DTX non-active periods. The apparatus may determine, based on one or more pre-defined rules, whether to apply the TDRA table specific to the one or more cell DTX non-active periods, wherein the one or more pre-defined rules may indicate to use the TDRA table specific to the one or more cell DTX non-active periods, if a time interval to a next cell DTX non-active period or to a time period during which scheduling is blocked is within a threshold.

As another example, the at least one uplink grant configuration may comprise information related to a TDRA table comprising a plurality of values, wherein a subset of the plurality of values may be specific to the one or more cell DTX non-active periods. The apparatus may determine, based on one or more pre-defined rules, whether to apply the subset of the plurality of values, wherein the one or more pre-defined rules may indicate to apply the subset of the plurality of values, if a time interval to a next cell DTX non-active period or to a time period during which scheduling is blocked is within a threshold.

As another example, the at least one uplink grant configuration may comprise information related to a TDRA table. The apparatus may determine whether a scheduling of the one or more uplink data transmissions occurs within a pre-defined time interval prior to a next cell DTX non-active period of the cell. Based on determining that the scheduling of the one or more uplink data transmissions occurs within the pre-defined time interval, the apparatus may interpret one or more slot offset values of the TDRA table differently compared to if the scheduling of the one or more uplink data transmissions would not occur within the pre-defined time interval. The one or more uplink data transmissions may be transmitted based on the interpretation of the one or more slot offset values.

The apparatus may refrain from transmitting a scheduling request during the one or more cell DTX non-active periods.

For example, the refraining may be based at least on a prohibit timer, wherein a value of the prohibit timer indicates a time period during which a transmission of the scheduling request is prohibited after a previous transmission of the scheduling request. The value of the prohibit timer applied during the one or more cell DTX non-active periods of the cell may be larger than a value of a prohibit timer applied during one or more cell DTX active periods of the cell.

Alternatively, or additionally, the refraining may be based at least on a larger physical uplink control channel resource periodicity during the one or more cell DTX non-active periods compared to a physical uplink control channel resource periodicity during one or more cell DTX active periods of the cell.

Alternatively, or additionally, the refraining may be based at least on a logical channel identifier associated with the one or more cell DTX non-active periods.

The apparatus may monitor, during or amongst the one or more cell DTX non-active periods, a sparser physical downlink control channel (PDCCH) search space compared to a physical downlink control channel search space monitored during one or more cell DTX active periods, wherein the cell DTX configuration may indicate the sparser physical downlink control channel search space.

Based on the cell DTX configuration, or another configuration received by the apparatus, the apparatus may determine whether to initiate PDCCH monitoring in a time interval after the apparatus performs a CG-PUSCH-based transmission during a cell DTX non-active period. This would allow the network (e.g., the RAN node 104) to switch to dynamic grants triggered by the reception of a CG-PUSCH transmission from the apparatus. In one example, the network decision to start using one or more dynamic grants during a cell DTX non-active period for the given apparatus may depend on the presence of a buffer status report (BSR) in the CG-PUSCH transmission received from the apparatus, or on the size of the BSR. In one example, the CG-PUSCH configuration to use during the cell DTX non-active period may be configured for the apparatus to transmit a BSR or a scheduling request.

Figure 9:
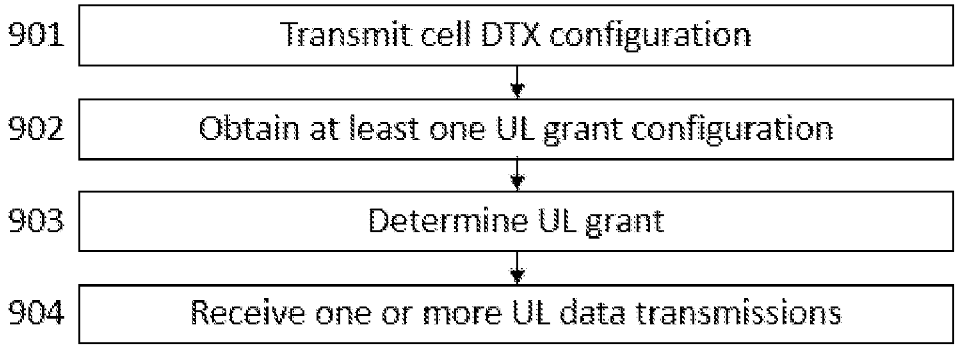
FIG. 9 illustrates a flow chart.

FIG. 9 illustrates a flow chart according to an example embodiment of a method performed by an apparatus 1100. For example, the apparatus 1100 may be, or comprise, or be comprised in, a network node 104 of a radio access network (RAN node).

Referring to FIG. 9, in block 901, the apparatus transmits a cell discontinuous transmission (DTX) configuration for a cell, the cell DTX configuration indicating one or more cell DTX non-active periods of the cell. Herein the term "cell" refers to a radio cell. The cell DTX configuration may be transmitted to one or more UEs 100, 102.

In block 902, the apparatus obtains at least one uplink grant configuration to be applied for one or more uplink data transmissions during the one or more DTX non-active periods of the cell.

In block 903, the apparatus determines, based on the at least one uplink grant configuration, an uplink grant for the one or more uplink data transmissions.

In block 904, the apparatus receives the one or more uplink data transmissions using the determined uplink grant during the one or more cell DTX non-active periods. The one or more uplink data transmissions may be received from the one or more UEs 100, 102. For example, the one or more uplink data transmissions may comprise one or more physical uplink shared channel (PUSCH) transmissions.

The at least one uplink grant configuration may be transmitted during a cell DTX active period of the cell.

As an example, the at least one uplink grant configuration may comprise a configured grant physical uplink shared channel (CG-PUSCH) configuration. For example, the apparatus may activate the CG-PUSCH configuration based at least on entering one of the one or more DTX non-active periods. As another example, the apparatus may activate the CG-PUSCH configuration based on entering one of the one or more cell DTX non-active periods, and based on completing reception of one or more uplink transmissions scheduled by one or more dynamic grants in the one of the one or more cell DTX non-active periods. The apparatus may deactivate the CG-PUSCH configuration based at least on entering a cell DTX active period of the cell.

As another example, the at least one uplink configuration may comprise at least two CG-PUSCH configurations, wherein at least one of the at least two CG-PUSCH configurations is to be applied during the one or more DTX non-active periods of the cell, and another at least one of the at least two CG-PUSCH configurations is to be applied during one or more DTX active periods of the cell.

As another example, the at least one uplink grant configuration may comprise information related to a time domain resource allocation (TDRA) table specific to the one or more cell DTX non-active periods. The apparatus may determine, based on one or more pre-defined rules, whether to apply the TDRA table specific to the one or more cell DTX non-active periods, wherein the one or more pre-defined rules may indicate to use the TDRA table specific to the one or more cell DTX non-active periods, if a time interval to a next cell DTX non-active period or to a time period during which scheduling is blocked is within a threshold.

As another example, the at least one uplink grant configuration may comprise information related to a TDRA table comprising a plurality of values, wherein a subset of the plurality of values may be specific to the one or more cell DTX non-active periods. The apparatus may determine, based on one or more pre-defined rules, whether to apply the subset of the plurality of values, wherein the one or more pre-defined rules may indicate to apply the subset of the plurality of values, if a time interval to a next cell DTX non-active period or to a time period during which scheduling is blocked is within a threshold.

As another example, the at least one uplink grant configuration may comprise information related to a TDRA table. The apparatus may determine whether a scheduling of the one or more uplink data transmissions occurs within a pre-defined time interval prior to a next cell DTX non-active period of the cell. Based on determining that the scheduling of the one or more uplink data transmissions occurs within the pre-defined time interval, the apparatus may interpret one or more slot offset values of the TDRA table differently compared to if the scheduling of the one or more uplink data transmissions would not occur within the pre-defined time interval. The one or more uplink data transmissions may be received based on the interpretation of the one or more slot offset values.

The cell DTX configuration may indicate the one or more UEs 100, 102 to refrain from transmitting a scheduling request during the one or more cell DTX non-active periods.

For example, the refraining may be based at least on a prohibit timer, wherein a value of the prohibit timer indicates a time period during which a transmission of the scheduling request is prohibited after a previous transmission of the scheduling request. The value of the prohibit timer applied during the one or more cell DTX non-active periods of the cell may be larger than a value of a prohibit timer applied during one or more cell DTX active periods of the cell.

Alternatively, or additionally, the refraining may be based at least on a larger physical uplink control channel resource periodicity during the one or more cell DTX non-active periods compared to a physical uplink control channel resource periodicity during one or more cell DTX active periods of the cell.

Alternatively, or additionally, the refraining may be based at least on a logical channel identifier associated with the one or more cell DTX non-active periods.

The blocks, related functions, and information exchanges (messages) described above by means of FIGS. 6-9 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 10:
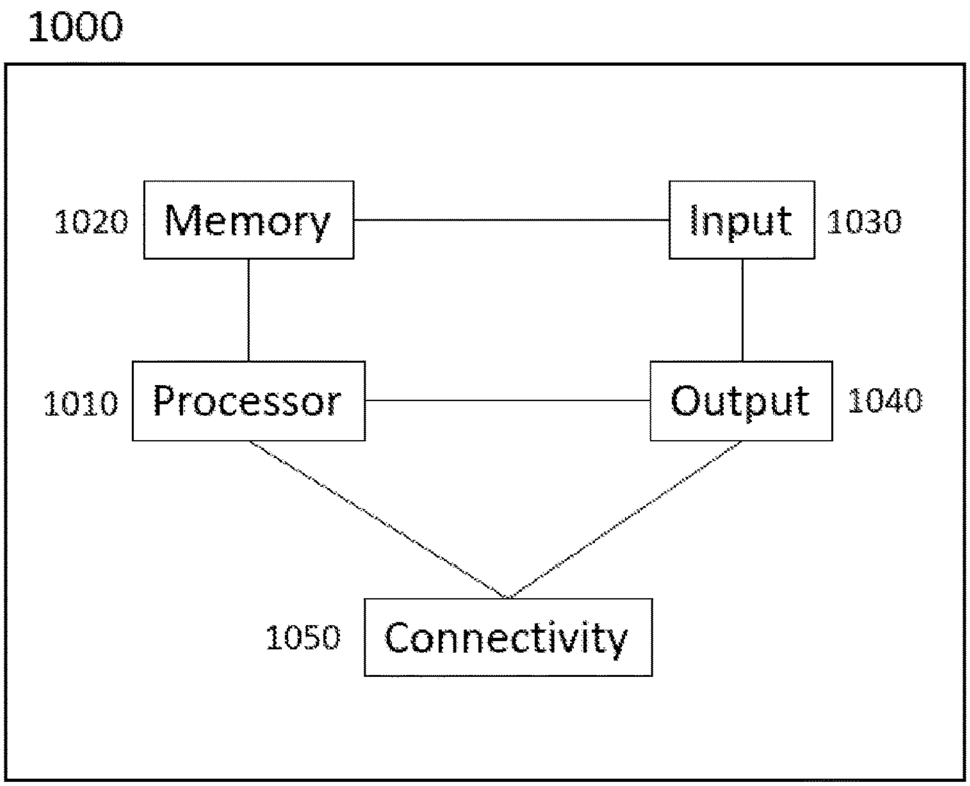
FIG. 10 illustrates an example of an apparatus.

FIG. 10 illustrates an example of an apparatus 1000 comprising means for performing one or more of the example embodiments described above. For example, the apparatus 1000 may be an apparatus such as, or comprising, or comprised in, a user equipment (UE) 100, 102. The user equipment may also be called a wireless communication device, a subscriber unit, a mobile station, a remote terminal, an access terminal, a user terminal, a terminal device, or a user device.

The apparatus 1000 may comprise a circuitry or a chipset applicable for realizing one or more of the example embodiments described above. For example, the apparatus 1000 may comprise at least one processor 1010. The at least one processor 1010 interprets instructions (e.g., computer program instructions) and processes data. The at least one processor 1010 may comprise one or more programmable processors. The at least one processor 1010 may comprise programmable hardware with embedded firmware and may, alternatively or additionally, comprise one or more application-specific integrated circuits (ASICs).

The at least one processor 1010 is coupled to at least one memory 1020. The at least one processor is configured to read and write data to and from the at least one memory 1020. The at least one memory 1020 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The at least one memory 1020 stores computer readable instructions that are executed by the at least one processor 1010 to perform one or more of the example embodiments described above. For example, non-volatile memory stores the computer readable instructions, and the at least one processor 1010 executes the instructions using volatile memory for temporary storage of data and/or instructions. The computer readable instructions may refer to computer program code.

The computer readable instructions may have been pre-stored to the at least one memory 1020 or, alternatively or additionally, they may be received, by the apparatus, via an electromagnetic carrier signal and/or may be copied from a physical entity such as a computer program product. Execution of the computer readable instructions by the at least one processor 1010 causes the apparatus 1000 to perform one or more of the example embodiments described above. That is, the at least one processor and the at least one memory storing the instructions may provide the means for providing or causing the performance of any of the methods and/or blocks described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer. The term "non-transitory," as used herein, is a limitation of the medium itself (i.e., tangible, not a signal) as opposed to a limitation on data storage persistency (e.g., RAM vs. ROM).

The apparatus 1000 may further comprise, or be connected to, an input unit 1030. The input unit 1030 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1030 may comprise an interface to which external devices may connect to.

The apparatus 1000 may also comprise an output unit 1040. The output unit may comprise or be connected to one or more displays capable of rendering visual content, such as a light emitting diode (LED) display, a liquid crystal display (LCD) and/or a liquid crystal on silicon (LCoS) display. The output unit 1040 may further comprise one or more audio outputs. The one or more audio outputs may be for example loudspeakers.

The apparatus 1000 further comprises a connectivity unit 1050. The connectivity unit 1050 enables wireless connectivity to one or more external devices. The connectivity unit 1050 comprises at least one transmitter and at least one receiver that may be integrated to the apparatus 1000 or that the apparatus 1000 may be connected to. The at least one transmitter comprises at least one transmission antenna, and the at least one receiver comprises at least one receiving antenna. The connectivity unit 1050 may comprise an integrated circuit or a set of integrated circuits that provide the wireless communication capability for the apparatus 1000. Alternatively, the wireless connectivity may be a hardwired application-specific integrated circuit (ASIC). The connectivity unit 1050 may also provide means for performing at least some of the blocks or functions of one or more example embodiments described above. The connectivity unit 1050 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1000 may further comprise various components not illustrated in FIG. 10. The various components may be hardware components and/or software components.

Figure 11:
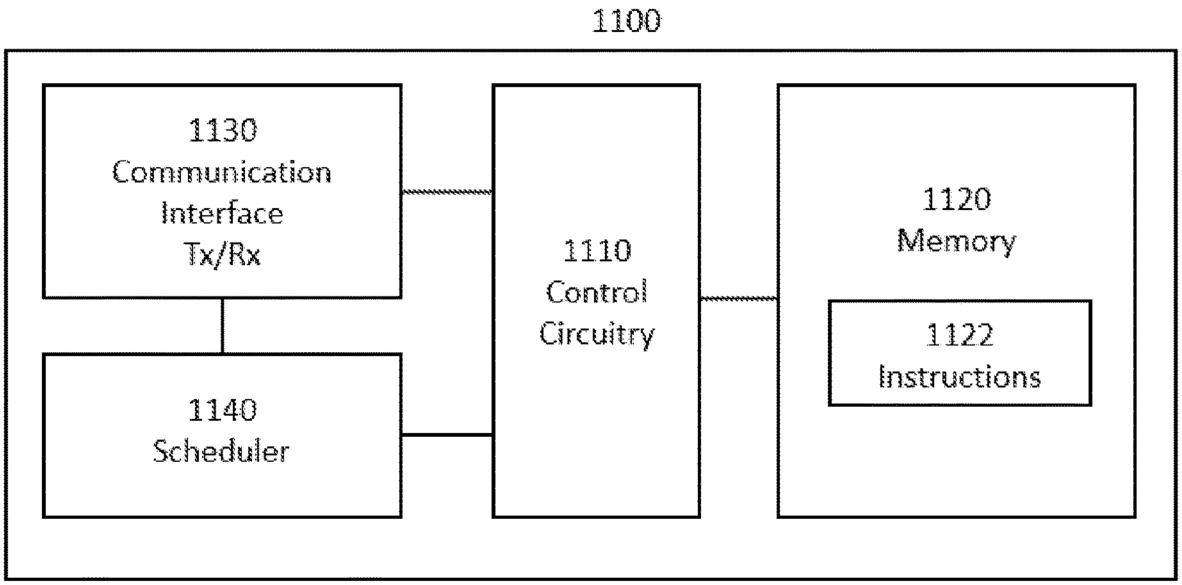
FIG. 11 illustrates an example of an apparatus.

FIG. 11 illustrates an example of an apparatus 1100 comprising means for performing one or more of the example embodiments described above. For example, the apparatus 1100 may be an apparatus such as, or comprising, or comprised in, a network node 104 of a radio access network.

The network node may also be referred to, for example, as a network element, a radio access network (RAN) node, a next generation radio access network (NG-RAN) node, a NodeB, an eNB, a gNB, a base transceiver station (BTS), a base station, an NR base station, a 5G base station, an access node, an access point (AP), a cell site, a relay node, a repeater, an integrated access and backhaul (IAB) node, an IAB donor node, a distributed unit (DU), a central unit (CU), a baseband unit (BBU), a radio unit (RU), a radio head, a remote radio head (RRH), or a transmission and reception point (TRP).

The apparatus 1100 may comprise, for example, a circuitry or a chipset applicable for realizing one or more of the example embodiments described above. The apparatus 1100 may be an electronic device comprising one or more electronic circuitries. The apparatus 1100 may comprise a communication control circuitry 1110 such as at least one processor, and at least one memory 1120 storing instructions 1122 which, when executed by the at least one processor, cause the apparatus 1100 to carry out one or more of the example embodiments described above. Such instructions 1122 may, for example, include computer program code (software). The at least one processor and the at least one memory storing the instructions may provide the means for providing or causing the performance of any of the methods and/or blocks described above.

The processor is coupled to the memory 1120. The processor is configured to read and write data to and from the memory 1120. The memory 1120 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1120 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 1120 or, alternatively or additionally, they may be received, by the apparatus, via an electromagnetic carrier signal and/or may be copied from a physical entity such as a computer program product. Execution of the computer readable instructions causes the apparatus 1100 to perform one or more of the functionalities described above.

The memory 1120 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data, such as a current neighbour cell list, and, in some example embodiments, structures of frames used in the detected neighbour cells.

The apparatus 1100 may further comprise or be connected to a communication interface 1130, such as a radio unit, comprising hardware and/or software for realizing communication connectivity with one or more wireless communication devices according to one or more communication protocols. The communication interface 1130 comprises at least one transmitter (Tx) and at least one receiver (Rx) that may be integrated to the apparatus 1100 or that the apparatus 1100 may be connected to. The communication interface 1130 may provide means for performing some of the blocks for one or more example embodiments described above. The communication interface 1130 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 1130 provides the apparatus with radio communication capabilities to communicate in the wireless communication network. The communication interface may, for example, provide a radio interface to one or more wireless communication devices. The apparatus 1100 may further comprise or be connected to another interface towards a core network such as the network coordinator apparatus or AMF, and/or to the access nodes of the wireless communication network.

The apparatus 1100 may further comprise a scheduler 1140 that is configured to allocate radio resources. The scheduler 1140 may be configured along with the communication control circuitry 1110 or it may be separately configured.

It is to be noted that the apparatus 1100 may further comprise various components not illustrated in FIG. 11. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the embodiments.

What is claimed is:

1. A User Equipment (UE) comprising:

at least one processor; and at least one memory storing instructions that, when executed by the at least one processor, cause the UE at least to:

receive, during a cell Discontinuous Transmission (DTX) active period of a cell, a cell DTX configuration for the cell, wherein the cell DTX configuration indicates:

one or more cell DTX non-active periods of the cell, one or more pre-defined rules for applying at least one uplink grant configuration, and a sparser Physical Downlink Control Channel (PDCCH) search space to be monitored during the one or more cell DTX non-active periods;

obtain, during the cell DTX active period, the at least one uplink grant configuration for one or more uplink data transmissions during the one or more DTX non-active periods of the cell, wherein the at least one uplink grant configuration comprises a Configured Grant Physical Uplink Shared Channel (CG-PUSCH) configuration;

activate the CG-PUSCH configuration in response to the UE entering one of the one or more DTX non-active periods after completing one or more uplink data transmissions scheduled by one or more dynamic grants during the cell DTX active period;

deactivate the CG-PUSCH configuration in response to the UE entering the cell DTX active period of the cell;

determine, based on the CG-PUSCH grant configuration, an uplink grant for the one or more uplink data transmissions;

transmit the one or more uplink data transmissions using the determined uplink grant during the one or more cell DTX non-active periods;

monitor, during the one or more cell DTX non-active periods, the sparser PDCCH search space compared to a PDCCH search space monitored during the cell DTX active periods; and refrain from transmitting a scheduling request during the one or more cell DTX non-active periods based on a scheduling-request prohibit timer, wherein a value of the scheduling-request prohibit timer applied during the one or more cell DTX non-active periods is larger than a value of a scheduling-request prohibit timer applied during the cell DTX active period.

2. The apparatus UE according to claim 1, wherein the UE receives at least one uplink grant configuration is received during the cell DTX active period of the cell.

3. The UE according to claim 1, wherein the at least one uplink grant configuration comprises at least two CG-PUSCH configurations, wherein one of the at least two CG-PUSCH configurations is to be applied during the one or more DTX non-active periods of the cell, and another one of the at least two CG-PUSCH configurations is to be applied during the one or more DTX active periods of the cell.

4. A method performed by a User Equipment (UE), the method comprising:

receiving, during a cell Discontinuous Transmission (DTX) active period of a cell, a cell DTX configuration for the cell, wherein the cell DTX configuration indicates:

indicating-one or more cell DTX non-active periods of the cell, one or more pre-defined rules for applying the at least one uplink grant configuration, and a sparser Physical Downlink Control Channel, (PDCCH) search space to be monitored during the one or more cell DTX non-active periods;

obtaining the at least one uplink grant configuration for one or more uplink data transmissions during the one or more DTX non-active periods of the cell, wherein the at least one uplink grant configuration comprises a Configured Grant Physical Uplink Shared Channel (CG-PUSCH) configuration a Configured Grant Physical Uplink Shared Channel, (CG-PUSCH), configuration;

activating the CG-PUSCH configuration in response to the UE entering one of the one or more DTX non-active periods after completing one or more uplink data transmissions scheduled by one or more dynamic grants during the cell DTX active period;

deactivating the CG-PUSCH configuration in response to the UE entering the cell DTX active period of the cell;

determining, based on the at least one uplink grant configuration, an uplink grant for the one or more uplink data transmissions;

transmitting the one or more uplink data transmissions using the determined uplink grant during the one or more cell DTX non-active periods;

monitoring, during the one or more cell DTX non-active periods, the sparser PDCCH search space compared to a PDCCH search space monitored during the cell DTX active periods; and refraining from transmitting a scheduling request during the one or more cell DTX non-active periods based on a scheduling-request prohibit timer, wherein a value of the scheduling-request prohibit timer applied during the one or more cell DTX non-active periods is larger than a value of a scheduling-request prohibit timer applied during the cell DTX active period.

5. The method according to claim 4, wherein the at least one uplink grant configuration is received during a cell DTX active period of the cell.

6. A non-transitory computer readable medium comprising program instructions which, when executed by a User Equipment (UE), cause the UE to perform at least the following:

receiving, during a cell Discontinuous Transmission (DTX) active period of a cell, a cell DTX configuration for the cell, wherein the cell DTX configuration comprises:

one or more cell DTX non-active periods of the cell, one or more pre-defined rules for applying the at least one uplink grant configuration, and a sparser Physical Downlink Control Channel, (PDCCH) search space to be monitored during the one or more cell DTX non-active periods;

obtaining the at least one uplink grant configuration to be applied for one or more uplink data transmissions during the one or more DTX non-active periods of the cell;

wherein the at least one uplink grant configuration comprises at least one consisting of:

a Configured Grant Physical Uplink Shared Channel, CG-PUSCH configuration, wherein the instructions further cause the UE to:

activate the CG-PUSCH configuration in response to the UE entering one of the one or more DTX non-active periods and completing one or more uplink transmissions scheduled by one or more dynamic grants in the one of the one or more cell DTX non-active periods, and deactivate the CG-PUSCH configuration in response to entering the cell DTX active period of the cell;

a time domain resource allocation (TDRA) table specific to the one or more cell DTX non-active periods, wherein the TDRA table specific to the one or more cell DTX non-active periods comprises at least one of: larger slot offset (K2) values or a larger number of repetition values, compared to a TDRA table used during cell DTX active periods, wherein the instructions further cause the UE to:

apply the TDRA table specific to the one or more cell DTX non-active periods based on one or more pre-defined rules that indicate to use the TDRA table specific to the one or more cell DTX non-active periods, in response to a determination that a time interval to a next cell DTX non-active period or to a time period during which scheduling is blocked is within a first threshold, adjust a number of repetitions of one of the one or more uplink data transmission to ensure the transmission completes prior to a last scheduling opportunity before the one or more cell DTX non-active periods, wherein the TDRA table comprising a plurality of values, wherein a subset of the plurality of values is specific to the one or more cell DTX non-active periods, wherein at least one value in the subset of the plurality of values is a special value that indicates the one or more uplink data transmissions are to be scheduled in a next available unscheduled slot, and wherein the instructions further cause the UE to apply the subset of the plurality of values based on the one or more pre-defined rules that indicate to apply the subset of the plurality of values, in response to a determination that a time interval to the next cell DTX non-active period or to a time period during which scheduling is blocked is within a second threshold;

determining, based on the at least one uplink grant configuration, an uplink grant for the one or more uplink data transmissions;

transmitting the one or more uplink data transmissions using the determined uplink grant during the one or more cell DTX non-active periods;

monitoring, during the one or more cell DTX non-active periods, the sparser physical downlink control channel, PDCCH, search space compared to a PDCCH search space monitored during the DTX active periods; and refraining from transmitting a scheduling request during the one or more cell DTX non-active periods, wherein the refraining is based on at least one of:

a prohibit timer, wherein a value of the prohibit timer applied during the one or more cell DTX non-active periods of the cell is larger than a value of a prohibit timer applied during the cell DTX active periods of the cell;

a larger physical uplink control channel resource periodicity during the one or more cell DTX non-active periods compared to a physical uplink control channel resource periodicity during the cell DTX active periods of the cell; or a logical channel identifier associated with the one or more cell DTX non-active period.

* * * * *